United States Patent [19]

Shimada et al.

[11] Patent Number: 4,775,967
[45] Date of Patent: Oct. 4, 1988

[54] BEAM SPOT CONTROL DEVICE USING A THIN MICRO LENS WITH AN ACTUATOR

[75] Inventors: Satoshi Shimada; Hiroshi Sasaki, both of Hitachi; Nobuyoshi Tsuboi, Tokai; Hideki Nihei; Norifumi Miyamoto, both of Hitachi; Ito Tetsuo, Mito; Yoshio Sato; Atsumi Watanabe, both of Hitachi; Ryo Hiraga, Hitachioota, all of Japan

[73] Assignee: Hitachi, Ltd., Tokyo, Japan

[21] Appl. No.: 786,499

[22] Filed: Oct. 11, 1985

[30] Foreign Application Priority Data

Oct. 11, 1984 [JP] Japan ................................ 59-211370
Oct. 17, 1984 [JP] Japan ................................ 59-216250
Feb. 22, 1985 [JP] Japan ................................ 60-34757

[51] Int. Cl.⁴ ............................................. G11B 7/00
[52] U.S. Cl. ..................................... 369/45; 369/112; 250/201
[58] Field of Search ..................... 369/44–47, 369/112; 250/201 DF; 358/342

[56] References Cited

U.S. PATENT DOCUMENTS

| 3,668,404 | 6/1972 | Lehovec | 250/211 J |
| 4,342,935 | 8/1982 | Kallmeyer et al. | 310/328 |
| 4,385,373 | 5/1983 | Howe | 369/45 |
| 4,425,023 | 1/1984 | Matsumoto et al. | 350/96.14 |
| 4,441,175 | 4/1984 | Shuman | 369/45 |

FOREIGN PATENT DOCUMENTS 0057070 8/1982 European Pat. Off.
3341589 6/1984 Fed. Rep. of Germany.

*Primary Examiner*—Robert L. Richardson
*Attorney, Agent, or Firm*—Antonelli, Terry & Wands

[57] ABSTRACT

In the present invention, a micro Fresnel lens in the shape of a thin film is used. A lens driving member constructed of piezoelectric transducers or of magnets and coils is disposed around the lens. The focus of the lens is adjusted by controlling applied voltages to the piezoelectric transducers or the coils.

23 Claims, 17 Drawing Sheets

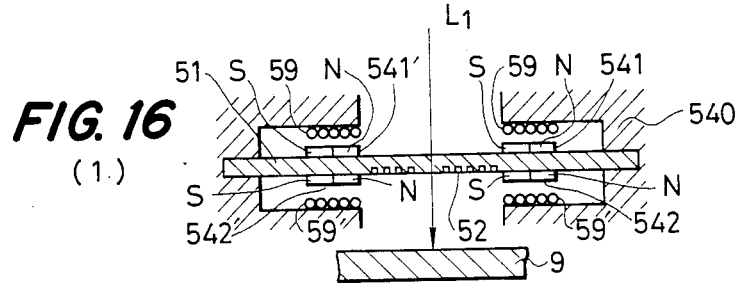
FIG. 16 (1.)
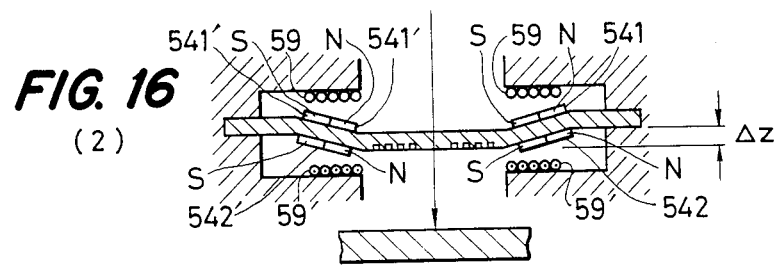
FIG. 16 (2)
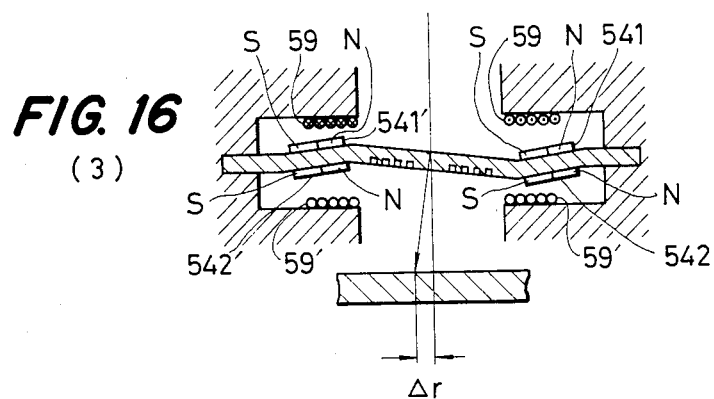
FIG. 16 (3)

(1)

(2)

FIG. 22
(A)
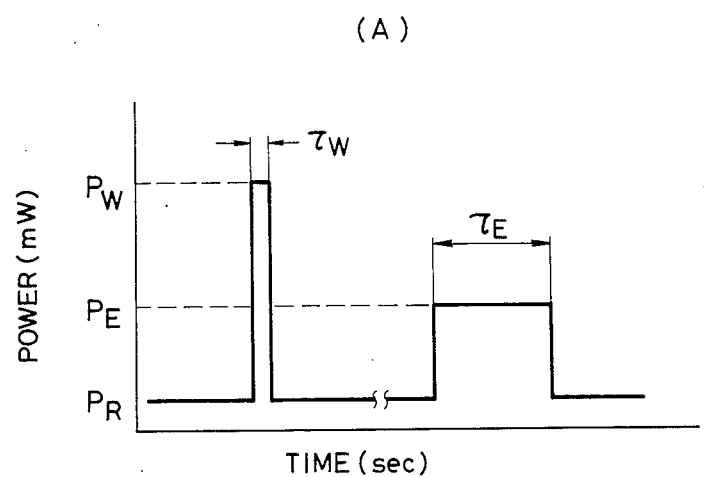
(B)
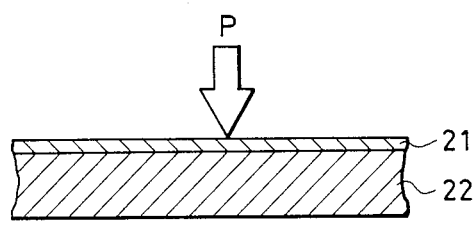

BEAM SPOT CONTROL DEVICE USING A THIN MICRO LENS WITH AN ACTUATOR

FIELD OF THE INVENTION

The present invention relates to an optical lens device which is well suited for use in optical systems requiring focusing, such as optical disc devices, cameras and laser beam printers.

BACKGROUND OF THE INVENTION

The devices mentioned above are optical systems each of which is constructed of a large number of lenses, and these lenses are principally made of glass. In addition, many of the lenses have lens driving mechanisms because the focusing needs to be automatically effected.

As a typical example of such optical systems, the optical disc device will be explained below. The optical disc device has been well known from HITACHI REVIEW Volume 33, Number 4 August 1984, pp. 187–192, "Development of Optical Video Disc and Player".

FIG. 1 shows the general arrangement of the optical system of a prior-art optical disc device. The symbols and operations of various portions in the figure will now be described. Numeral 1 designates a laser diode which serves as a light source. Numeral 2 designates a collimation lens, which turns the light beam of the laser diode 1 into a collimated beam. Shown at numeral 3 is a polarizing beam splitter (hereinbelow, abbreviated to 'PBS'), which transmits the output beam of the collimation lens therethrough and which refracts retrogressive light from a λ/4 plate indicated by numeral 4 to be stated next. The λ/4 plate 4 is used for the phase polarization of light in order to facilitate the discrimination between the input light and reflected light in the PBS 3. Numeral 5 indicates an objective, which is used for condensing input light. Numeral 6 indicates a coupling lens, which receives a beam from the PBS 3 and condenses it. The coupling lens 6 is composed of two semicylindrical lenses which are crossed. Shown at numeral 7 is a photosensor. The photosensor 7 senses the shape of the light spot of input light L6 from the coupling lens 6, thereby to indirectly sense the shape of the light spot of output light L5 from the objective 5. Numeral 8 denotes an actuator, which adjusts the focal position of the output light L5 of the objective 5 in accordance with the output of the photosensor 7. Shown at numeral 81 is a lens driving unit, which adjusts the position of the objective 5 in accordance with a drive control output from the actuator 8. Numeral 9 denotes a disc which can optically record, reproduce and erase information by way of example and which is partly illustrated. The disc 9 is capable of the recording, reproduction, erasing etc. in such a way that the output light L5 from the objective 5 projects a desired light spot on the surface of the disc. Numeral 10 denotes a motor, by which the disc 9 is driven.

FIG. 2 illustrates a prior-art example of the photosensor 7 shown in FIG. 1. In the figure, symbol L6 indicates the output light L6 of the coupling lens 6 in FIG. 1. Symbols P1, P2, P3 and P4 denote photodiodes for converting the quantities of light into electric signals, respectively. Letting V1, V2, V3 and V4 denote the output voltages of the photodiodes P1, P2, P3 and P4 produced when the light spot of the input light L6 is truly circular, respectively, they are set so as to become equal to one another. Numerals 71 and 72 indicate subtracters for tracking on the disc 9, respectively. By detecting the output signal of the difference (V1−V2) between the output voltage V1 of the photodiode P1 and the output voltage V2 of the photodiode P2, whether or not the output light L5 from the objective 5 is projected on a predetermined line is indirectly discriminated. When the output light L5 of the objective lens 5 is not impinging symmetrically with respect to the information recording line of the disc 9, a difference arises between the output voltages V1 and V2. Therefore, the deviation from the recording line on the disc 9 is sensed according to the magnitude and sign of the difference, and a tracking control signal TA1 for controlling the position of the objective 5 is produced until the difference becomes null.

Likewise to the subtracter 71, the subtracter 72 provides a tracking control signal TA2 by receiving the output voltages V3 and V4 of the respective photodiodes P3 and P4 as input signals. Numerals 73 and 74 designate adders, and numeral 75 designates a comparator. They constitute a portion adapted to produce an output signal FA for autofocus control for adjusting the focal depth at which the output light L5 of the objective 5 impinges on the disc 9. More specifically, when the focal depth coincides with the recording line of the disc 9, the input light L6 is in the state of the true circle and enters the photodiodes P1, P2, P3 and P4 equally, and the quantity of the light flux thereof is the largest. The output voltages V1, V2, V3 and V4 are equal to one another, and the magnitude thereof becomes the maximum. On the other hand, in a case where the focal depth has deviated to render the input light 16 elliptical and to cause a difference between values (V1+V3) and (V2+V4) created with the output voltages V1, V2, V3 and V4 of the respective photodiodes P1, P2, P3 and P4, the portion operates so as to eliminate the difference. That is, the value of (V1+V3)−(V2+V4) is detected using the adders 73, 74 and the comparator 75, and the position of the objective 5 is adjusted until the output signal FA becomes zero. FIG. 3 shows a prior-art example of the driving unit 81 for the objective 5 based on the tracking and the autofocus control. Referring to the figure, numerals 811, 812, 813 and 814 designate coils. Shown at numeral 815 is a holder for the objective 5. Numerals 816 and 817 indicate magnets, numerals 818 and 819 springs, and numeral 820 a frame. The objective 5 is fixed by the holder 815, and is installed on the frame 820 of an optical head by the springs 818 and 819. The magnets 816 and 817 are used as ones among elements for determining the position of the objective 5. By making the holder 815 a magnetic member such as iron piece, the position of the objective 5 is determined by the attractive forces of the magnets 816, 817 and the tensile strengths of the springs 818, 819. In accordance with the focus controlling output signal FA from the arrangement of FIG. 2, currents are caused to flow through the coils 811 and 812 so as to move the position of the objective 5 up or down and to establish the desired focal depth. The tracking control signals TA1 and TA2 cause currents to flow through the coils 813 and 814 respectively so as to adjust the lateral position of the objective 5 and to perform the desired tracking. According to the prior-art system described above, the tracking and the focal depth control for accurately projecting the light spot with respect to the recording line of the disc can be carried out.

Further, a prior-art optical disc device is disclosed in Japanese Patent Application Laid-open No. 59-92444 entitled 'Pickup for Optical Disc', laid open on May 28, 1984. This known example replaces an objective with a micro Fresnel lens formed with a concentric grating portion, so as to intensify the diffraction and convergence of light from a light source.

However, the prior-art optical disc devices are very complicated optical systems, and the automatic adjustment of a focus involves the problems of a large number of constituent components and slow response.

SUMMARY OF THE INVENTION

An object of the present invention is to provide an optical lens device in which lenses are rendered light in weight and simple in structure and which is small-sized and affords a quick response in focusing.

The present invention consists in that a micro Fresnel lens in the shape of a thin film is used as a lens, and that lens driving members composed of piezoelectric transducers or magnets and coils are disposed around the thin film-shaped lens so as to effectuate focusing by controlling applied voltages to the piezoelectric transducers or the coils.

According to the present invention, an optical lens device can be constructed into a light-weight and small-sized one. As a result, an optical lens device the focusing of which is of quick response can be provided.

BRIEF DESCRIPTION OF THE DRAWINGS

FIGS. 16, (1–3) are views for explaining voltages to be applied to coils for moving the movable micro lens shown in FIG. 15 and the operation of a lens substrate.

FIGS. 22(A) and 22(B) show diagrams for explaining input thermal energy to a recording alloy film.

DETAILED DESCRIPTION OF THE PREFERRED EMBODIMENTS

Figure 2:
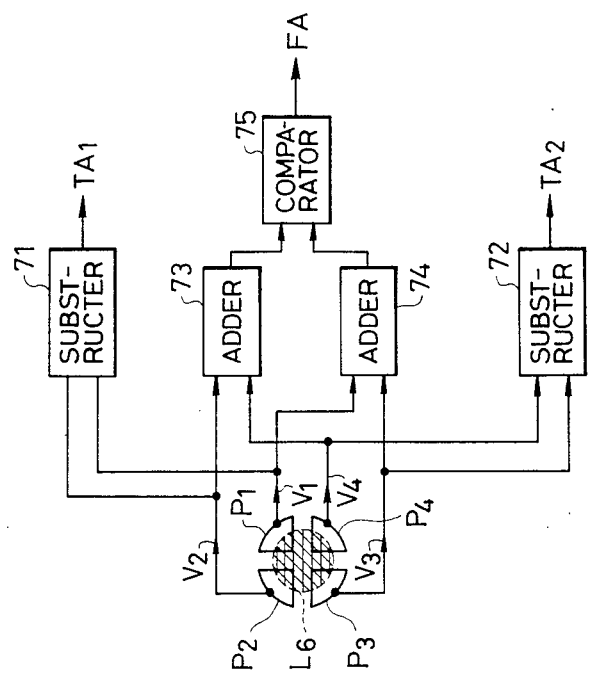
FIG. 2 shows a block diagram of a photosensor in the optical disc device shown in FIG. 1.
Figure 1:
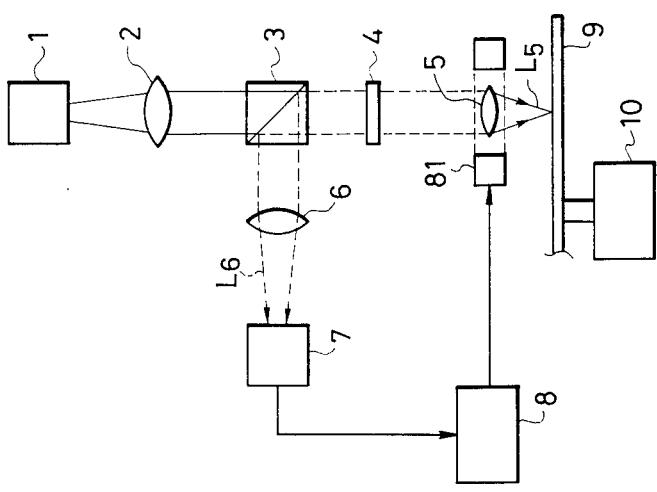
FIG. 1 shows a general arrangement diagram of the optical system of a known optical disc device.
Figure 3:
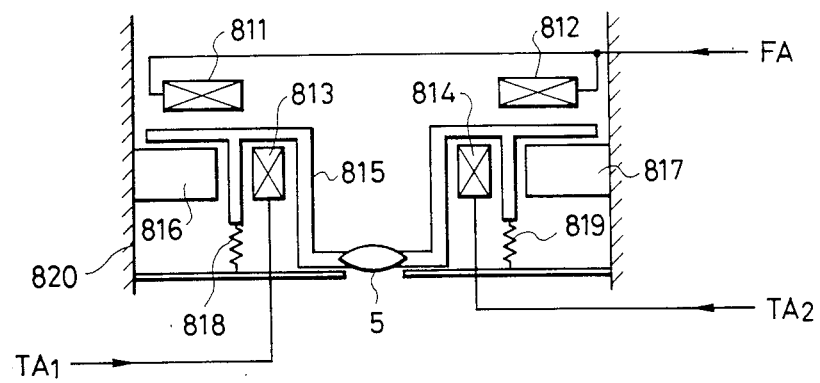
FIG. 3 shows an arrangement diagram of an objective driving unit in the optical disc device shown in FIG. 1.
Figure 4:
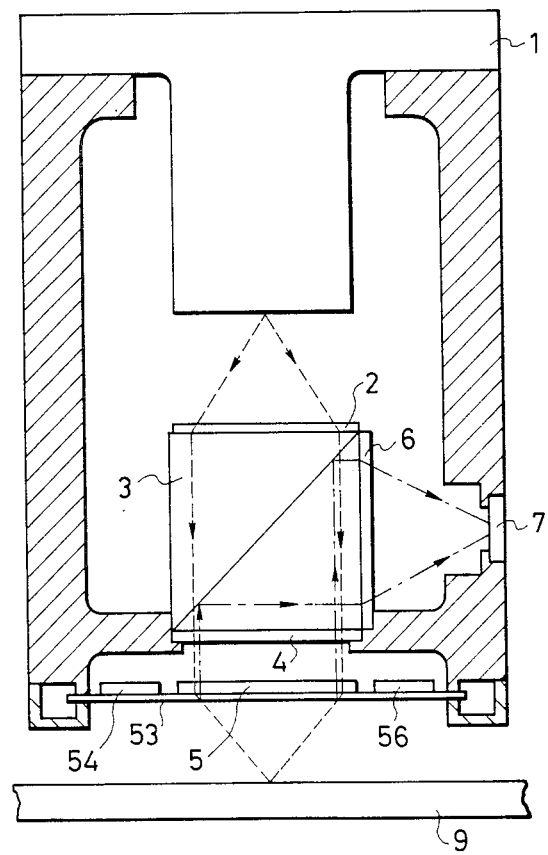
FIG. 4 shows a general arrangement diagram of an optical disc device to which an optical lens device according to the present invention is applied.

Referring to FIG. 4, divergent light emerging from a laser diode 1 which is excited by a recording pulse is turned into a collimated beam by a collimation lens 2 being a micro Fresnel lens (MFL) to be described later. The collimated beam is transmitted through a polarizing beam splitter 3, to be turned into linearly polarized light. The linearly polarized light is condensed by an objective 5 being an MFL to be described later, to form a focus on a disc 9. Here, the polarizing beam splitter is used for preventing light reflected from a disc surface from retrogressing to the laser diode 1, owing to the combination thereof with a $\lambda/4$ plate. More specifically, the $\lambda/4$ plate 4 is a phase difference plate which functions to change linearly polarized light into circularly polarized light, the linearly polarized light oscillating in a direction defining 45 degrees to an optic axis contained in a cut plane, and to change the circularly polarized light into the linearly polarized light. When the light reflected from the disc passes through the $\lambda/4$ plate 4, the direction of the linearly polarized light is changed by 90 degrees from that at the time of incidence. Accordingly, the reflected light from the disc is not returned to the side of the laser diode 1 by the polarizing beam splitter 3, but the total quantity of the light is refracted to the side of a photosensor 7. Since a coupling lens 6 is a micro Fresnel lens (zone plate) having the function of a semicylindrical lens as will be described later, the shape of a spot to be formed on the photosensor 7 differs depending upon the distance between the objective 5 and the disc 9, and this is grasped as increase or decrease in the signal of the sensor. Consequently, the distance between the objective 5 and the disc 9, namely, focusing and the radial direction of the spot, namely, tracking can be controlled using the signal of the photosensor 7. The focusing and tracking can be effected by controlling voltages which are applied to piezoelectric transducers 54 and 56 disposed on a spring 53 supporting the objective 5. The details will be described later.

In this manner, according to the optical disc device which employs the optical lens device of the present invention, the expensive collimation lens, objective and cylindrical lenses having heretofore been required can be replaced with the inexpensive micro Fresnel lenses, and moreover, the labor of optic axis adjustments requiring a long time can be dispensed with by directly joining them to the polarizing beam splitter 3. Besides, since the objective is rendered light in weight and is supported by the pliable spring 53, it can be controlled by the piezoelectric transducers 54 and 56 formed in the shape of thin films, and the structure is simplified. Especially, the frequency characteristics of the optical disc device are enhanced owing to the light weight of the lens. Further, when the entire arrangement is viewed, an optical head which extends from the laser diode 1 to the objective 5 including an actuator can be miniaturized.

Figure 5:
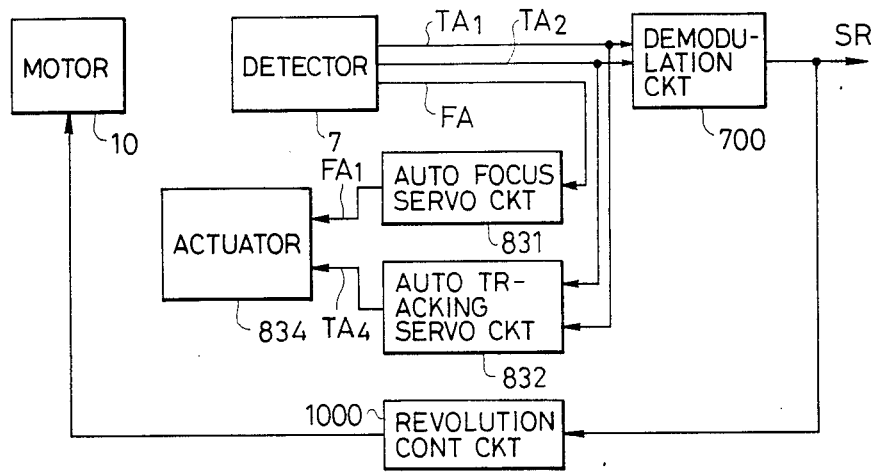
FIG. 5 shows a block diagram of a control system in the optical disc device shown in FIG. 4.

Referring to FIG. 5, numeral 7 designates the detector or photosensor in the optical head. Numeral 831 indicates an autofocus servo circuit which, in response to a focus control signal FA output from the photosensor 7, drives an actuator 834 for controlling the optical head in accordance with a focus control signal FA1, thereby to focus a light beam from the objective 5 of the optical head on the disc 9 (not shown).

Numeral 832 indicates an autotracking servo circuit which, in response to tracking control signals TA1 and TA2 output from the photosensor 7, drives the actuator 834 in accordance with a tracking control signal TA4, thereby to position the light beam from the objective 5 of the optical head on the track of the disc 9.

Numeral 1000 indicates a revolution control circuit which, in response to a reproduction signal SR output from a demodulation circuit 700, drives a motor 10 so as to control the revolution number of the disc 9.

The demodulation circuit 700 is one which demodulates the reproduction signal from the tracking control signals TA1 and TA2 output from the photosensor 7.

Figure 6:
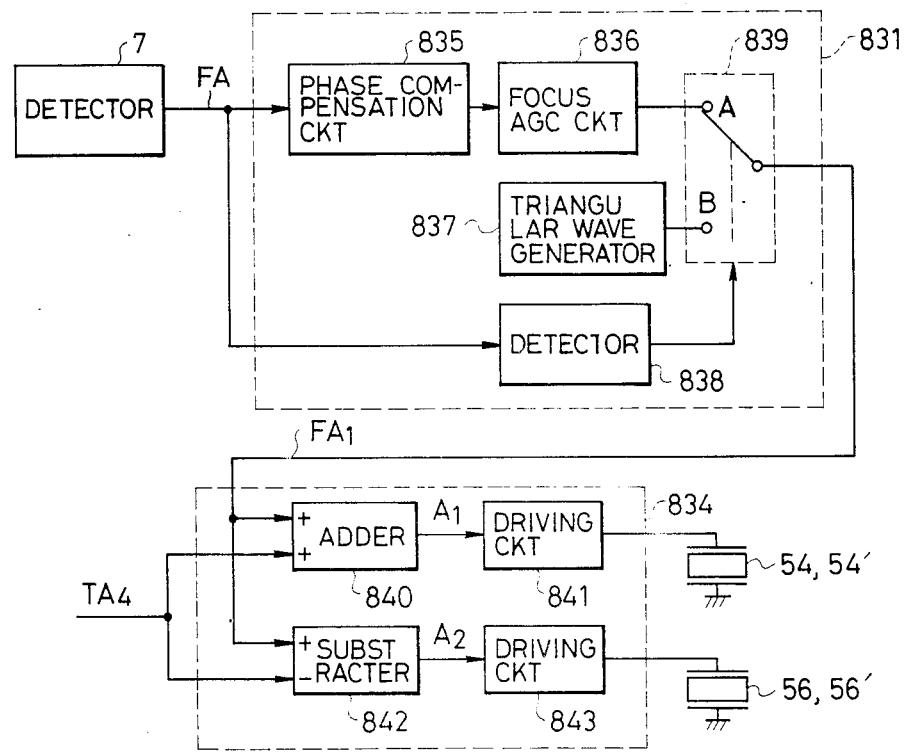
FIG. 6 shows a block diagram of an autofocus servo system in the optical disc device shown in FIG. 4.

FIG. 6 shows the detailed arrangements of the autofocus servo 831 and the actuator 834.

The focus control signal FA from the photosensor 7 passes through a phase compensation circuit 835, a focus AGC (automatic gain control) circuit 836 and a switching circuit 839, to become the focus control signal FA1 which is subjected to a gain control to a predetermined magnitude in correspondence with either of write and read modes.

The focus control signal FA1 is added by an adder 840 with the tracking control signal TA4 subjected to a gain control, and the piezoelectric transducer 54 is driven through a driving circuit 841 in accordance with the drive signal A1=FA1+TA4.

Likewise, the tracking control signal TA4 subjected to the gain control is subtracted from the focus control signal FA1 by a subtracter 842, and the piezoelectric transducer 56 is driven through a driving circuit 843 in accordance with the drive signal A2=FA1−TA4.

In a case where the disc is not set, the output of a triangular wave generator 837 is applied to the driving circuits 841 and 843 through the switching circuit 839, whereupon the objective is moved up and down by the displacements of piezoelectric transducers 54, 54', 56 and 56'. When the disc 9 is set to apply the focus control signal FA to a detector 838, the switching circuit 839 changes-over to a side A, whereupon the optical head is controlled by the autofocus servo mechanism.

As stated above, the piezoelectric transducers 54 and 56 are driven by the drive signals A1=FA1+TA4 and A2=FA1−TA4 which are based on the focus control signal FA1 and the tracking control signal TA4. When the focus control signal becomes plus, the piezoelectric transducers stretch by way of example, so that the objective 5 comes near to the disc 9. When the objective 5 lies at a focused position, the focus control signal FA1 is zero, and the objective 5 does not move in the vertical direction. In case of setting the focus control signal FA1 so as to change in the plus direction when the objective 5 comes away from the disc 9 with respect to the focused position, the objective 5 approaches the disc 9 and moves to the focused position owing to the displacements of the piezoelectric transducers 54, 54', 56 and 56' described above. In this manner, the foregoing autofocus control circuit permits the focus of the objective 5 to be formed on the disc 9 at all times against the vibrations of the plane of the disc 9, etc.

Figure 7:
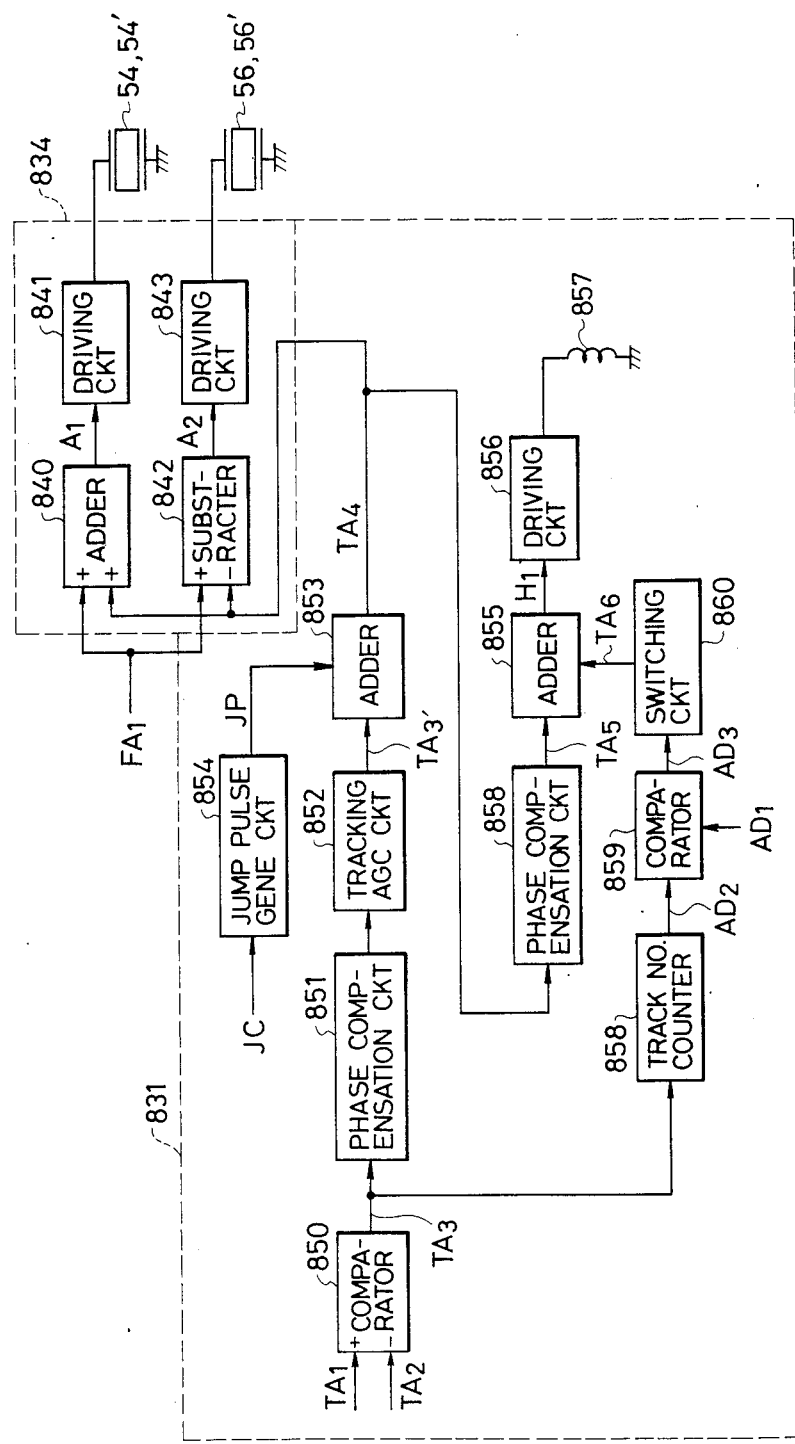
FIG. 7 shows a block diagram of a tracking servo system in the optical disc device shown in FIG. 4.

FIG. 7 shows the detailed arrangements of the autotracking servo 832 and the actuator 834 in FIG. 5.

The tracking control signals TA1 and TA2 are converted into a tracking control singal TA3 (=TA1−TA2) by a comparator 850.

This tracking control singal TA3 passes through a phase compensation circuit 851 and a tracking AGC circuit 852, to become an input to an adder 853.

On the other hand, a jump command JC for moving the track on which the light beam is projected is applied to a jump pulse generator circuit 854, the output jump pulse JP of which also becomes an input to the adder 853.

The output TA4 of this adder 853 is applied to both an adder 840 and a subtracter 842, the respective outputs A1 and A2 of which become A1=FA1+TA4 and A2=FA1−TA4 in relation to the focus control signal FA1. These drive signals A1 and A2 are applied to the piezoelectric transducers 54, 54', 56 and 56' through driving circuits 841 and 843, whereby these piezoelectric transducers 54, 54', 56 and 56' are displaced in accordance with the tracking control signal TA4.

The sign of the tracking control signal TA4 in the drive signals A1 and A2, which are applied to the piezoelectric transducers 54, 54', 56 and 56', is set so that the two piezoelectric transducers 54 and 54' may more reversely (one may extend, whereas the other may shrink) in accordance with the tracking control signal TA4.

Accordingly, the displacements which are induced in the piezoelectric transducers 54 and 54' in accordance with the tracking control signal TA4 change the angle of the objective 5 from the plane of the objective 5 parallel to the surface of the disc 9 so that the light beam from the objective 5 may move orthogonally to the track on the disc 9. Therefore, the tracking control signals TA1 and TA2 detected by the photosensor 7 are applied to the foregoing circuit, whereby the autotracking servo can be arranged which performs such a control that the deviation of the light beam relative to the track can be eliminated to accurately project the light beam on the track.

Besides, when the track jump command JC for moving the track which is projected by the light beam is input, the jump pulse JP is added to the tracking control signal TA4, whereby the projection track of the light beam is moved.

Further, the tracking control signal TA4 is converted into a low frequency tracking control signal TA5 through a phase compensation circuit 858 which excludes a high frequency signal and passes only a low frequency component. The low frequency signal is applied to an adder 855, the output of which is applied to a driving circuit 856.

In accordance with the head feed signal H1 output from the adder 855, the driving circuit 856 supplies current to an actuator coil 857 for feeding the optical head.

Since the tracking control signal TA5 is free from the high frequency component, the head feed signal H1 becomes a D.C. signal corresponding to the fact that the track on which the light beam is projected is gradually moved in the radial direction by the revolution of the disc. Therefore, the radial feed of the optical head is carried out by this control system.

In case of widely moving the track on which the light beam is projected, a move track command AD1 is applied to a comparator 859.

This comparator 859 is supplied with a moved track number AD2 which has been obtained in such a way that the zero crosses of the tracking control signal TA3, namely, electric signals repeatedly produced at the respective crosses of the tracks of the disc by the beam are counted by a track number counter 858. A track number AD3, which remains when the moved track number AD2 is subtracted from the move track command AD1, is output.

The remaining track number AD3 is applied to a switching circuit 860. The adder 855 is fed with a tracking control signal TA6 according to which the supply voltage of the switching circuit 860 is output when the remaining track number is greater than N, whereas the output is made null when the number is at most N. Here, N denotes the number of tracks the tracking of which can be controlled by the movement of the objective based on the piezoelectric transducers 54 and 54'.

Owing to the above arrangement, in accordance with the move track command AD1, the maximum voltage is applied to the actuator coil for feeding the optical head, to move the optical head at the highest speed until the projection track of the light beam falls within N from the move track command AD1. When the projection track of the light beam has fallen within N from the move track command AD1, the track jump command decided by a microcomptter not shown is input to the jump pulse generator circuit 854 this time, so that the light beam is controlled so as to be projected on the track appointed by the move track command AD1, by the objective control based on the piezoelectric transducers 54 and 54'.

Figure 8:
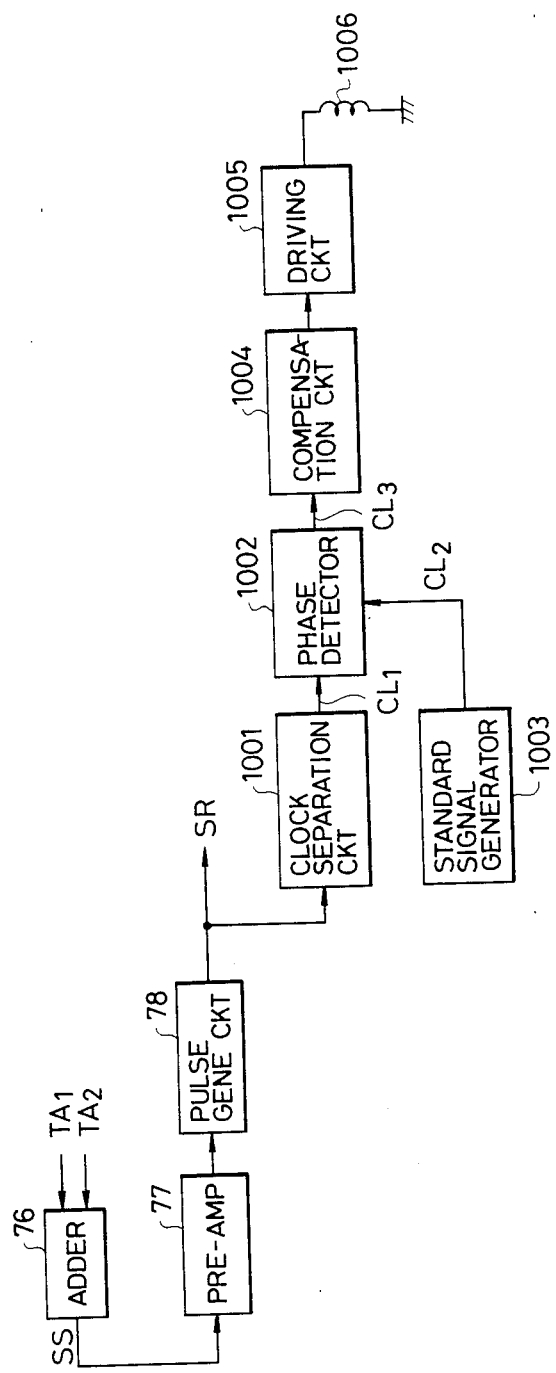
FIG. 8 shows a block diagram of a revolution control system in the optical disc device shown in FIG. 4.

FIG. 8 illustrates the details of the revolution control 1000 and the motor 10 in FIG. 5.

The tracking control signals TA1 and TA2 are added by an adder 76, to obtain the summation SS of detection light signals which are produced in such a way that the reflected light of the light beam projected on the disc 9 is detected by the photosensor 7. The summation signal is passed through a pre-amplifier 77 and a signal creating circuit 78, to create the reproduction signal SR.

A clock separation circuit 1001 having received the reproduction signal SR outputs a clock CL1 synchronous with the frequency of the reproduction signal. The clock CL1 is subjected to phase detection by a phase detector 1002 on the basis of the output pulse CL2 of a reference signal generator 1003. The output CL3 of the phase detector 1002 corresponding to the phase difference between the clock CL1 and the reference signal CL2 is applied to a driving circuit 1005 through a compensation circuit 1004, with the result that current corresponding to the phase difference of the clock CL1 relative to the reference signal CL2 flows through the coil 1006 of the motor 10 for rotating the disc. Accordingly, the revolution number control of the motor 10 is performed so that the reproduction signal frequency of the disc may agree with the frequency of the reference signal.

Next, the collimation lens and the coupling lens 6 in FIG. 4 will be described. First, the collimation lens 2 will be explained with reference to FIGS. 9 and 10.

Figure 9:
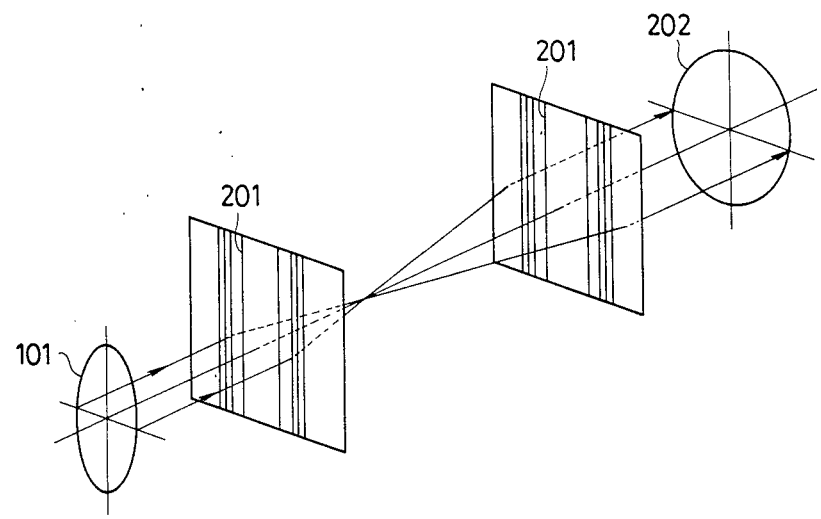
FIG. 9 is an explanatory diagram of the optical system of the optical disc device shown in FIG. 4, the optical system including a collimation lens which utilizes Fresnel zone plates.

FIG. 9 shows an optical system which utilizes Fresnel zone plates to convert an anisotropic beam (elliptical beam) into an isotropic beam (truly circular). The Fresnel zone plate indicated by numeral 201 is a functional element which has the capability of concentrating light unidirectionally. It has the same function as that of a cylindrical lens (semicylindrical lens), and it features a lighter weight and a smaller size as compared with the cylindrical lens. The anisotropic beam 101 emergent from the semiconductor laser is converted into the isotropic beam 202 by the two Fresnel zone plates 201.

Figure 10:
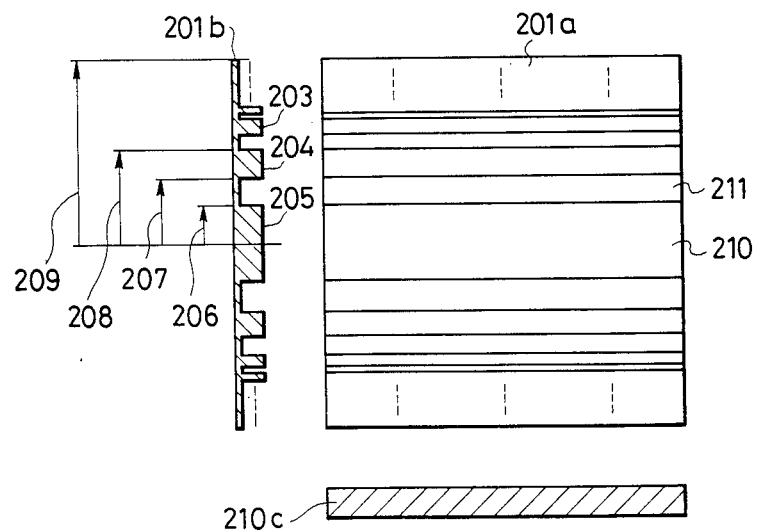
FIG. 10 is a constructional view of either of the Fresnel zone plates shown in FIG. 9.

Symbol 201a in FIG. 10 denotes a top plan view of the Fresnel zone plate 201. Symbols 201b and 201c denote sideward views of this element. Rugged portions (concave portions: 211, convex portions: 210) are alternately formed on this element in accordance with the following rule. Letting $f_0$ denote the focal distance of the Fresnel zone plate (the distance at which a collimated beam having entered is concentrated on a single point), and $r_1$, $r_2$, $r_3$ ... and $r_n$ denote the distances from the center of the element to the slots or valleys in the order in which they are closer to the center, an equation:

$$r_n = \sqrt{n \cdot f_0 \cdot \lambda} \quad (1)$$

holds. Here, $\lambda$ indicates the wavelength of the entering light. Concretely, $r_1$ is indicated by numeral 206 in the figure, $r_2$ by numeral 207, and $r_n$ by numeral 209.

Figure 11:
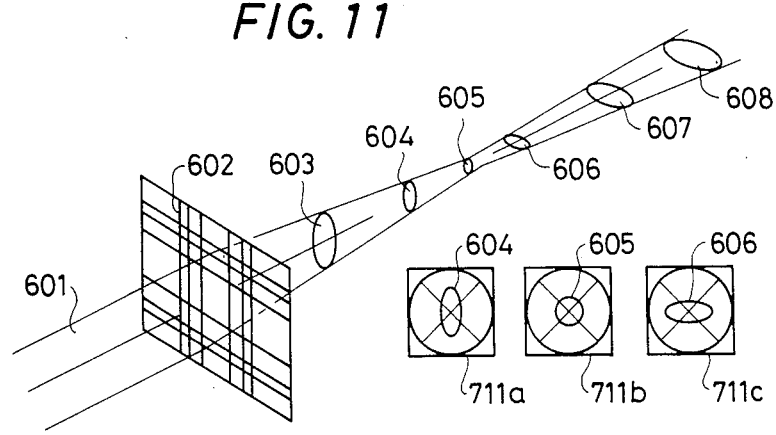
FIG. 11 is an explanatory diagram of an astigmatism type focal position detecting optical system in the optical disc device shown in FIG. 4, the optical system being based on a coupling lens which utilizes a Fresnel zone plate.
Figure 12:
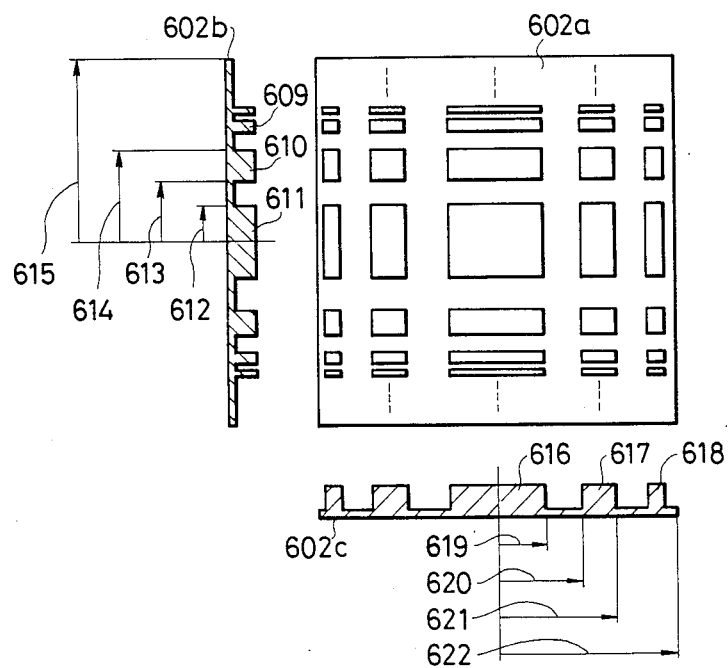
FIG. 12 is a constructional view of the Fresnel zone plate shown in FIG. 11.

FIGS. 11 and 12 show arrangement diagrams of an astigmatism type focal position detecting optical system which utilizes a Fresnel zone plate, and the Fresnel zone plate, respectively. These correspond to the coupling lens 6 in FIG. 6. An astigmatism type focal position detecting system is a technique in which two cylindrical lenses having different focal positions are arrayed in crossing directions, and a transmitted beam is changed from an ellipse longer in a certain direction into an ellipse longer in a direction orthogonal to the certain direction, thereby to detect a focal position.

The characterizing feature of the present arrangement that the two crossed cylindrical lenses are realized by the single Fresnel zone plate, to make the optical system light in weight and small in size.

The focal distance f of the Fresnel zone plate is determined by the following equation:

$$f = (r_n)^2 / n\lambda \quad (2)$$

Here, n denotes the number of the concave and convex portions of the Fresnel zone plate, $r_n$ the distance from the center of the plate to the n-th concave or convex portion, and $\lambda$ the wavelength of light. That is, unequal focal distances can be given by changing the value of n, namely, the number of the concave and convex portions.

A practicable example is a composite Fresnel zone plate which is indicated by numeral 602 in FIG. 11. The concave and convex portions in the vertical direction and the lateral direction of the plate are formed at unequal pitches, and unequal focal distances are afforded in the respective directions.

When a collimated light beam 601 is projected on the composite Fresnel zone plate 602, the shape of the output beam thereof varies continuously as indicated by numerals 603 to 608. In a case where quadrantal sensors indicated at numeral 711 are installed at the position of a true circle indicated by numeral 605 in correspondence with the focused position of the objective of the optical disc device; when the objective defocuses to deform the collimated beam, the output signals of the quadrantal sensors become different because the beam shape on the sensors varies as indicated by symbol 711a or 711c. The defocusing can be sensed on the basis of the output difference.

FIG. 12 shows the details of the composite Fresnel zone plate. The recesses of the pitches unequal to one another are formed in a manner to recur in the vertical and lateral directions of the single plate, and the role of two cylindrical lenses having unequal focal distances is attained with the single plate. A focal position $f_1$ based on the recesses in the vertical direction is given from Equation (2) as follows: ps $$f_1 = (r_n)^2/n\lambda \tag{3}$$

$r_n$ indicates the maximum distance from the center in the vertical direction, and in the figure, $r_1$ is given by numeral 612, $r_2$ by numeral 613, ... and $r_n$ by numeral 615.

Likewise, a focal position $f_2$ based on the recesses in the lateral direction is derived from Equation (2) as follows:

$$f_2 = (r_n')^2/n\lambda \tag{4}$$

$r_n'$ denotes the maximum distance from the center in the lateral direction, and in the figure, $r_1'$ is given by numeral 619, $r_2'$ by numeral 620, ... and $r_n'$ by numeral 622.

Figure 13:
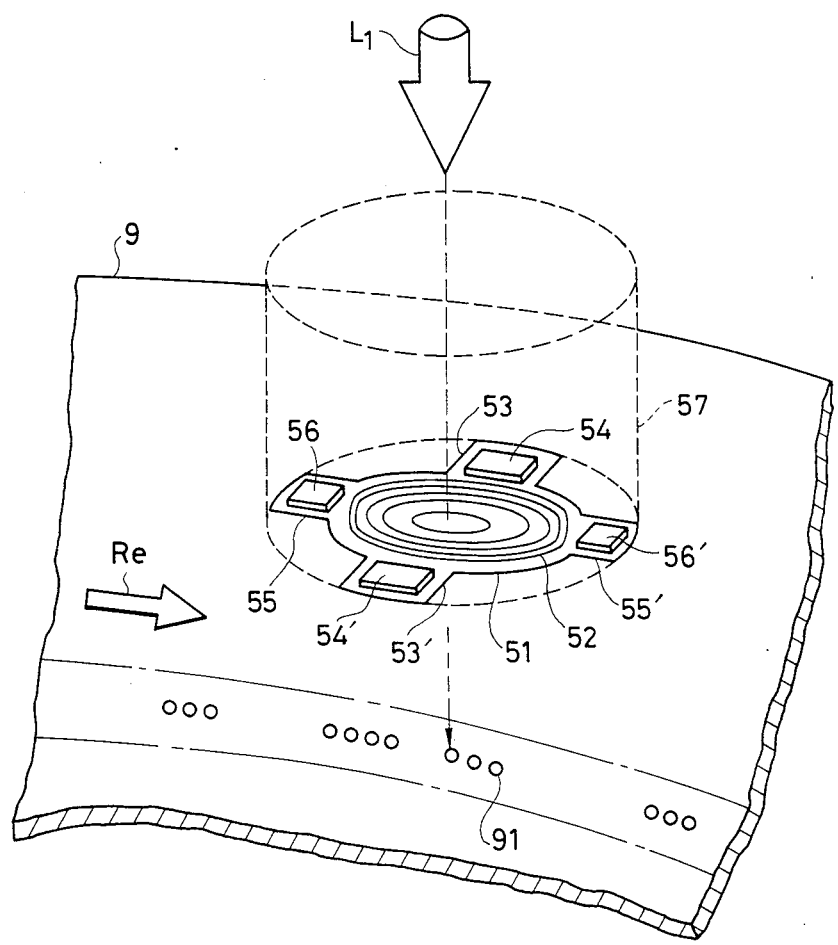
FIG. 13 is a view of the first embodiment of a movable micro lens which is the essential portion of the present invention.
Figure 14:
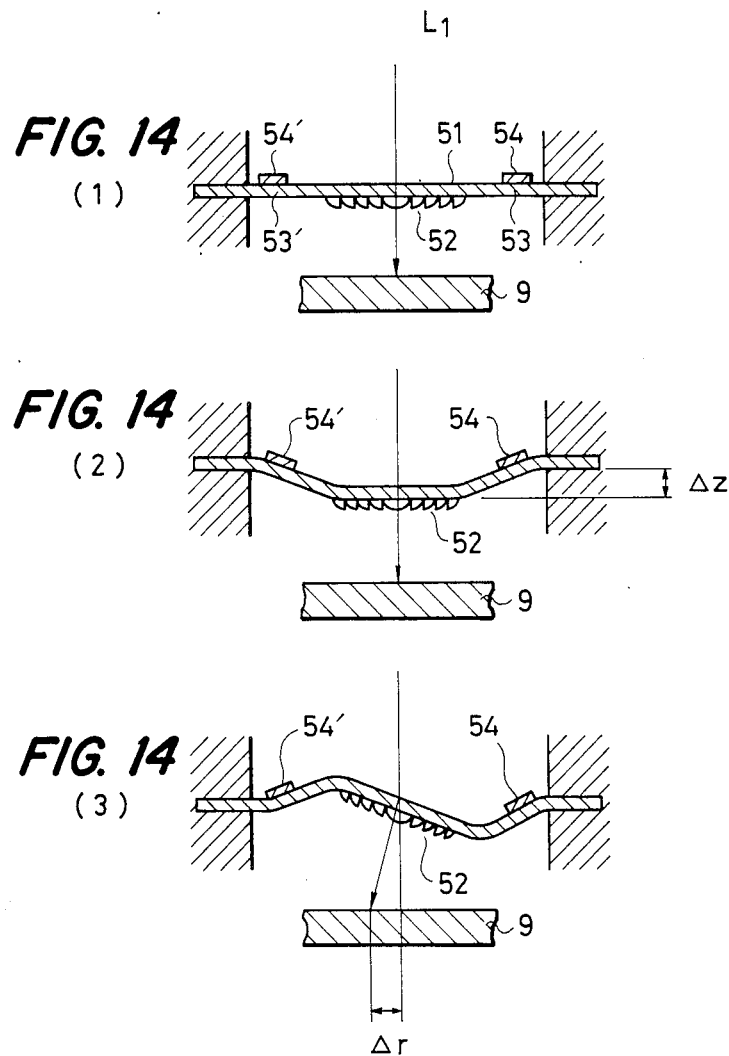
FIG. 14, (1–3) are views for explaining voltages to be applied to piezoelectric transducers on the movable micro lens shown in FIG. 13 and the operation of a lens substrate.

Referring now to FIGS. 13 and 14, the structure and operation of an embodiment of the movable micro lens which is the principal portion of the present invention will be described. Numeral 51 indicates a substrate which is made of a transparent material such as glass, ceramics or plastics. Numeral 52 indicates a thin-film Fresnel lens which is formed on the substrate by applying the technique of photolithography, and which is of the so-called GRIN type that forms a refractive index profile in the transparent substrate. Using a process which diffuses an impurity directly into the substrate, a plurality of circles the intervals of which gradually narrow from the center of the substrate are formed in the substrate in accordance with the refractive index profile. The radius $R_n$ of the n-th circle is given by Equation (1) mentioned before.

As already stated, such a lens has heretofore been known as the Fresnel lens function element. In recent years, the application of photolithographic microprocessing has made it possible to manufacture micro Fresnel lenses of very small sizes. Regarding an example of dimensions, very thin small-diameter lenses in which the thickness of a substrate is several tens - several hundreds μm and the outside diameter of a Fresnel lens is 100 μm - several mm can be mass-produced photolithographically. Numerals 53, 53', 55 and 55' designate beams which are formed on the outer side of the substrate, and which elastically support the central circular lens portion 52. Thin piezoelectric transducers 54, 54', 56 and 56' of PVF (polyvinylidene fluoride) or the like are deposited on the beams. They are so formed that the arrayal direction of the piezoelectric transducers 54 and 54' which are respectively arranged on the beams 53 and 53' in the radial direction of the disc intersects orthogonally to the arrayal direction of the piezoelectric transducers 56 and 56' which are respectively arranged on the beams 55 and 55' in the circumferential direction, namely, rotating or moving direction Re of the disc. As illustrated in FIG. 14, the direction of a light beam $L_1$ which enters the lens 52 and is condensed by the same is oscillated in the directions of the corresponding beams by adjusting voltages which are applied to the piezoelectric transducers 54, 54', 56 and 56'. FIG. 14 elucidates the voltages applied to the respective piezoelectric transducers and the behavior of the lens substrate 51. In a case where no voltage is applied to the piezoelectric transducers 54 and 54', the substrate 51 is not deformed and the light beam L1 therefore enters the disc 9 perpendicularly as shown at (1) in FIG. 14. In a case where, as shown in FIG. 13, the laser beam L1 is projected on the disc 9 to record information, it needs to be converged to a spot diameter of about 1 μm on the disc. Therefore, when the disc 9 moves up and down due to the rotation thereof, etc., the lens 51 must continually move following up the up and down motions so as to converge the light beam L1 on the surface of the disc 9. To this end, the vertical motions of the disc are detected by the focus sensing stated before (refer to FIG. 11), whereupon a control is performed so as to keep the distance between the disc 9 and the lens 52 constant. In (2) of FIG. 14, by applying voltages of the same polarity and the same value to the piezoelectric transducers 54 and 54', the elastic supports 53 and 53' are symmetrically deformed to bestow a displacement $\Delta z$ in the vertical direction on the lens 52 so as to hold the distance from the disc 9 constant. In addition, since an information bit 91 on the disc 9 as shown in FIG. 13 is as small as about 1 μm, the projection beam for writing or reading the information bit 91 must be controlled with the accuracy of the dimension and thrown thereon. In contrast, the radial oscillations of the disc 9 attendant upon the rotation or movement thereof are as great as several μm, so that the light spot converging on the disc 9 needs to follow up the oscillations. That is, the elastic supports 53 and 53' arrayed in the radial direction of the disc are asymmetrically deformed by applying voltages of the opposite polarities and the same potential or of the same polarity and unequal potentials to the piezoelectric transducers 54 and 54' deposited thereon, to incline the lens 52 as shown in (3) of FIG. 14 (exaggeratedly depicted for better understanding), whereby the light spot on the disc 9 is deflected by $\Delta r$ in a direction parallel to the lens so as to follow up the oscillations ascribable to the rotation or movement. The elastic supports 55 and 55' arrayed in the track direction of the disc 9 are asymmetrically deformed with such an expedient, whereby the light spot on the disc 9 can also be caused to jitter. In case of applying the present invention as the objective of a rewritable optical disc, the jittering is useful as the function of projecting light for a period of time which is required for erasing the information bits 91 written on the disc 9.

While, in the above description, the objective for the optical disc has been exemplified and outlined as to the construction which has the single micro Fresnel lens on the transparent substrate, the thin-film lens device of the present invention is effective owing to the very small size and low cost, also for devices for information equipment including a bar code reader, a laser beam printer etc., as means for scanning a light beam in two directions at high speed. Besides, while in the description of FIG. 13 the GRIN lens formed with the refractive index profile in the substrate has been exemplified as the embodiment of the thin-film lens, it is also allowed to use a micro Fresnel lens in which the transparent substrate as shown in FIG. 14 is coated with PMMA (polymethyl methacrylate) as a photoresist material to a film thickness of about 1 $\mu$m, and it is microprocessed by photolithography. Since, however, the PMMA material is inferior in moisture resistance, the micro Fresnel lens should preferably be constructed for long term use in such a way that grooves are formed in the transparent substrate by the technique of stamping.

Figure 15:
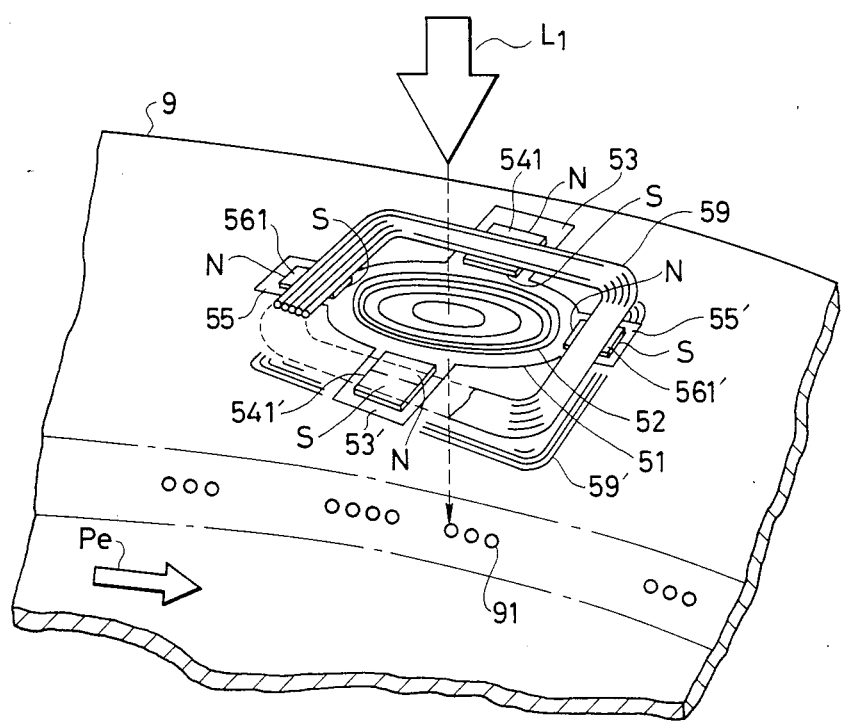
FIG. 15 is a view of the second embodiment of the movable micro lens which is the essential portion of the present invention.

Referring now to FIGS. 15 and 16, the structure and operation of the second embodiment of the movable micro lens which is the principal portion of the present invention will be described. In FIG. 15, numerals 53, 53', 55 and 55' designate beams which are formed on the outer side of a substrate 51, and which elastically support a circular lens portion 52 located centrally. Thin magnets $54_1$, $54_1'$, $56_1$, $56_1'$ and $54_2$, $54_2'$, $56_2$, $56_2'$ are deposited on the upper surfaces and lower surfaces of the beams. The arrayal direction of the magnets $54_1$, $54_1'$ and $54_2$, $54_2'$ arranged on the upper surfaces and lower surfaces of the beams 53, 53' in the radial directions Ra, Ra' of the disc 9 and with the lens portion 52 held therebetween intersects orthogonally to the arrayal direction of the magnets $56_1$, $56_1'$ and $56_2$, $56_2'$ arranged on the upper surfaces and lower surfaces of the beams 55, 55' in the circumferential directions T, T' of the disc 9 and with the lens portion 52 held therebetween. Thus, the magnets totaling eight are deposited in a manner to hold the crossed supports 53, 53' and 55, 55' from above and below.

An example of a method of arraying the eight magnets will be explained below with reference to FIGS. 15 and 16.

Regarding the outer peripheral side support 53 in the radial direction RR' of the substrate 51, the magnets $54_1$ and $54_2$ respectively deposited on the upper and lower surfaces of the support 53 are mounted so as to have N-poles on the outer peripheral side of the substrate 51 and S-poles on the inner peripheral side thereof.

Regarding the inner peripheral side support 53' in the radial direction RR' of the substrate 51, the magnets $54_1'$ and $54_2'$ respectively deposited on the upper and lower surfaces of the support 53' are mounted so as to have N-poles on the inner peripheral side of the substrate 51 and S-poles on the outer peripheral side thereof.

The magnets $56_1$, $56_1'$, $56_2$ and $56_2'$ mounted in the circumferential direction TT' of the substrate 51 have S-poles on the head side of an arrow Re indicative of the rotating or moving direction of the disc 9 with respect to the lens portion 52 and N-poles on the opposite side, on both the upper surfaces and lower surfaces of the supports 55 and 55'.

A flat coil 59 is disposed over the magnets $56_1$, $56_1'$, $54_1$ and $54_1'$ with a certain space therebetween, and it is bonded and fixed to a housing 540 shown in FIG. 16. As shown in (1) of FIG. 17, the flat coil 59 consists of serially connected coils $59_1$, $59_2$, $59_3$ and $59_4$ for inclining the lens portion 51 up and down in the circumferential direction TT' of the disc 9, and serially connected coils $59_5$, $59_6$, $59_7$ and $59_8$ for inclining the lens portion 51 up and down in the radial directions Ra and Ra' of the disc 9. Each of the coils $59_1$, $59_3$, $59_6$ and $59_8$ consists of a plurality of parallel coils which are short-circuited at both their ends, while each of the coils $59_2$, $59_4$, $59_5$ and $59_7$ consists of a single lead or foil for connecting the parallel coils. Now, when + potentials are applied to terminals ① and ② and a - potential to a terminal ③ as illustrated FIG. 17(1), the substrate 51 undergoes asymmetric vertical motions in the track direction (circumferential direction) owing to the interaction between current flowing through the coils $59_1$, $59_2$, $59_3$ and $59_4$ and the magnets $54_1$, $54_1'$, $56_1$ and $56_1'$, and when A.C. voltages are applied, the input beam L1 is caused to jitter. Likewise, the lens substrate 51 undergoes asymmetric vertical motions in the radial direction of the disc 9 so as to perform tracking, owing to the interactions between current flowing through the coils $59_5$, $59_6$, $59_7$ and $59_8$ and the magnets $54_1$, $54_1'$, $56_1$ and $56_1'$. Under these circumstances, when current has flowed through the coil 59 as illustrated in FIG. 16(3), forces acting on the right and left magnet plates are opposite, and the main lens 51 inclines, with the result that the output beam is deflected by $\Delta r$ on the disc 9.

Figure 17:
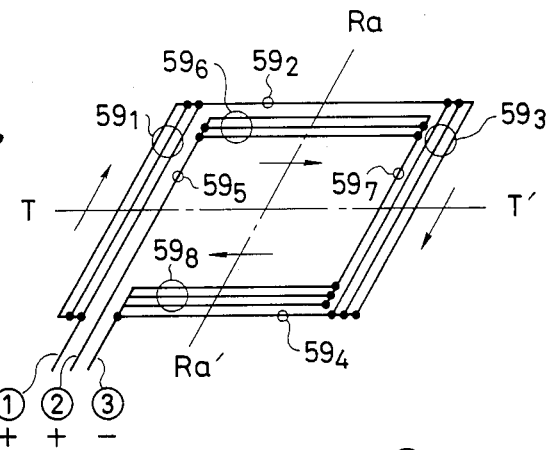
FIG. 17, (1) and (2) are arrangement diagrams of the coils shown in FIG. 15.
Figure 17:
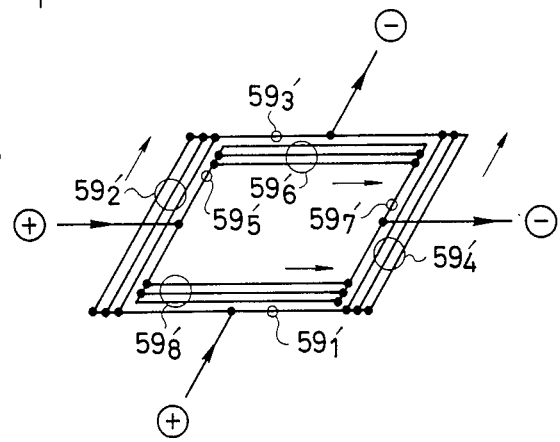

A flat coil 59' is disposed under the magnets $56_2$, $56_2'$, $54_2$ and $54_2'$ with a certain space therebetween. As shown in (2) of FIG. 17, the coil 59' is made up of a parallel winding consisting of coils $59_5'$, $59_6'$, $59_7'$ and $59_8'$ for moving the lens portion 51 up or down in parallel in the circumferential direction TT' of the disc 9, and a parallel winding consisting of coils $59_1'$, $59_2'$ $59_3'$ and $59_4'$. Each of the coils $59_2'$, $59_4$, $59_6'$ and $59_8'$ consists of a plurality of parallel coils which are short-circuited at both their ends, while each of the coils $59_1'$, $59_3'$, $59_5'$ and $59_7'$ consists of a single lead or foil. Now, when $\ominus$ potentials are applied to the coils $59_1'$ and $59_5'$ and $\oplus$ potentials to the coils $59_3'$ and $59_7'$ as illustrated in FIG. 17(2), the interactions between currents flowing through the coils $59_1'$, $59_2'$, $59_3'$, $59_4'$, $59_5'$, $59_6'$, $59_7'$ and $59_8'$ and the magnets $54_2$, $54_2'$ $56_2$ and $56_2'$ exert forces of an identical sense on the beams 53, 53', 55 and 55' as illustrated in FIG. 16(2), so that a vertical motion $\Delta z$ is induced. That is, focusing can be performed when the disc 9 has caused vertical oscillations.

Needless to say, the adjustment $\Delta z$ or $\Delta r$ as indicated in FIG. 16(2) or (3) can be realized even when the polarities of the magnets $54_1$, $54_1'$, $56_1$, $56_1'$, $54_2$, $54_2'$, $56_2$ and $56_2'$ are changed from those in FIG. 15 or when the polarities + and − shown in FIGS. 17(1) and (2) are inverted according to certain rules.

Figure 18:
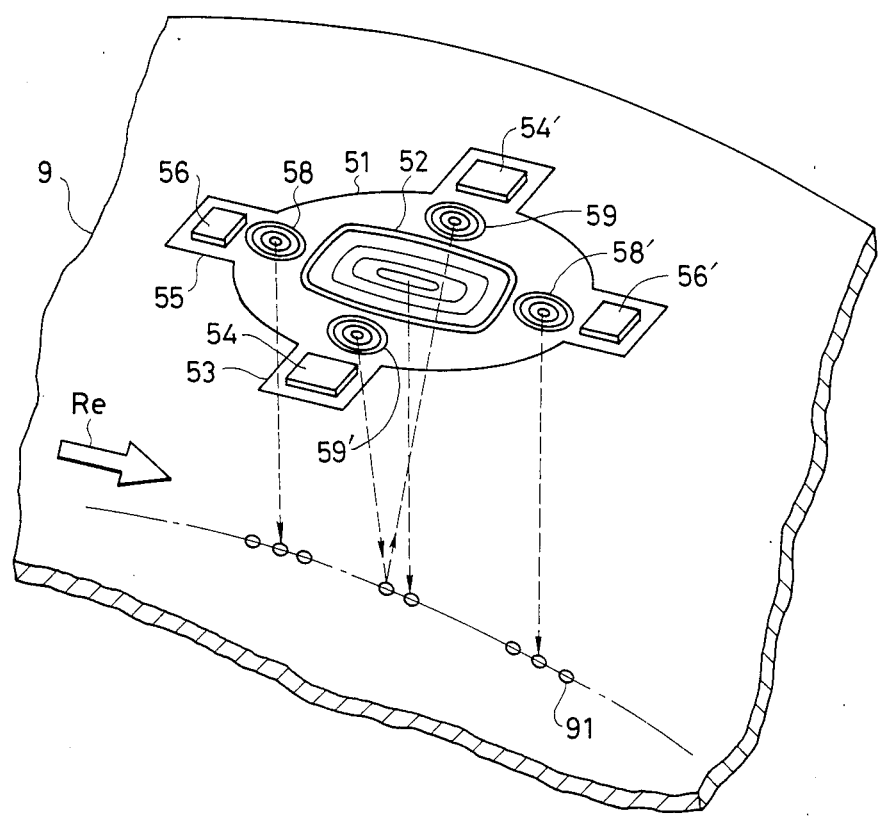
FIG. 18 shows a movable micro lens which has functions necessary for an optical disc.

FIG. 18 shows another embodiment of the thin-film lens device which has a function necessary for an optical disc. A substrate 51 is a thin plate made of a transparent material such as glass, in which a main lens 52 is arranged in a central part, and track sensing small lenses 59 and information sensing small lenses 58 in respective numbers of two are arranged in a peripheral part. These lenses are microprocessed with the same photolithographic technique as explained in FIGS. 13, 14, 15, 16 and 17, and as the dimensions thereof, the diameter of the main lens 52 is 2 mm and the diameters of the sensing lenses 58 and 59 are 0.5 mm by way of example. Elastic supports 53 and 55 are disposed in a crossed relationship outside the lenses, and thin piezoelectric transducers 54, 54', 56 and 56' are deposited thereon. Light from a laser diode falls down onto a range of the small lenses 58, 58', 59 and 59', but the intensity thereof is low because of the vicinity of the peripheral edge of a Gaussian distribution. In contrast, the intensity of light falling on the main lens 52 is very high and has enough power to write an information bit 91 on the disc 9, so that the diameter of a spot is fined to a diffraciion limit. Besides, in case of erasing the information bit 91 detected by the sensing lens 58, it can be erased in such a way that whilst applying voltages of opposite polarities to the piezoelectric transducers 56 and 56', the light spot on the disc is caused to jitter and vibrate in the track direction (circumferential direction) of the disc so as to project the information bit for a required period of time. The reason is that, in general, a material the phase change of which is utilized has an erasing period of time longer than a writing period of time, so the light spot needs to be projected for the requried period of time while following up the information bits on the disc. The small lenses 59 detect a line along which the information bits 91 are written, with a track sensing light beam, and when the spot of the beam has deviated from the line, voltages of opposite polarities are applied to the piezoelectric transducers 54 and 54', whereby tracking is performed according to the expedient of FIGS. 14 and 16.

Next, the disc 9 as a recording medium will be described. The recording medium is characterized by being made of a metal or alloy having at least two sorts of crystalline structures in the solid state thereof, in which the crystalline structure in one temperature region is held in the other temperature region and/or optical characteristics such as reflection factors, and volume changes different from each other arise in the crystalline state thereof. The optical characteristic changes and volume changes of the recording medium are bestowed on the recording medium as the reflection factor changes by the optical head device.

Examples of the alloys are a Cu-Al alloy, a Cu-Zn alloy, a Cu-Al-Zn alloy, a Cu-Al-Ni alloy, a Cu-Al-Mn alloy, a Cu-Al-Fe-Cr alloy, a Cu-Ga alloy, a Cu-Al-Ga alloy, a Cu-In alloy, a Cu-Al-In alloy, a Cu-Ge alloy, a Cu-Al-Ge alloy, a Cu-Sn alloy, a Cu-Te alloy, a Cu-Ti alloy, a Cu-Al-Sn alloy, a Cu-Zn alloy, a Cu-Si alloy, a Cu-Sb alloy, a Cu-Be alloy, a Cu-Be alloy, a Cu-Mn alloy, a Cu-Pd alloy, a Cu-Pt alloy, an Ag-Zn alloy, an Ag-Al alloy, an Ag-Cd alloy, an Ag-In alloy, an Ag-Ga alloy, an Ag-Al-Au alloy, an Ag-Al-Cu alloy, an Ag-Al-Au-Cu alloy, an Ag-Al-Cd alloy, an Ag-Pt alloy, an Ag-S alloy, an Ag-Sn alloy, an Ag-Te alloy, an Ag-Ti alloy, an Ag-Zr alloy, an Ag-As alloy, an Ag-Au alloy, an Ag-Be alloy, an Ag-Mg alloy, an Ag-Li alloy, an Ag-Mn alloy, an Al-Fe alloy, an Al-Mg alloy, an Al-Mn alloy, an Al-Pd alloy, an Al-Te alloy, an Al-Ti alloy, an Al-Zn alloy, an Al-Zr alloy, an Ni-Sb alloy, an Ni-Si alloy, an Ni-Sn alloy, an Ni-Ga alloy, an Mn-Ge alloy, an Ni-Ge alloy, an Ni-Mn alloy, an Ni-S alloy, an Ni-Ti alloy, an Fe-As alloy, an As-S alloy, an As-Zn alloy, an Fe-Be alloy, an Fe-Ni alloy, an Fe-Cr alloy, an Fe-P alloy, an Mn-Pd alloy, an Mn-Pt alloy, an Mn-Sb alloy, an Mn-Si alloy, an Au-Ca alloy, an Au-Al alloy, an Au-In alloy, an Au-Ga alloy, an Au-Cd alloy, an Au-Cu alloy, an Au-Fe alloy, an Au-Mn alloy, an Au-Zn alloy, a Ba-Ca alloy, a Bi-Pb alloy, a Bi-Tl alloy, a Ti-Ni alloy, an Ni-V alloy, an Ni-Zn alloy, a Cd-Li alloy, a Cd-Mg alloy, a Cd-Pb alloy, a Cd-Sb alloy, an Mg-Ce alloy, a Co-Cr alloy, a Co-Ge alloy, a Co-Mn alloy, a Co-Sb alloy, a Co-V alloy, an In-Mg alloy, an In-Mn alloy, an In-Ni alloy, an In-Sn alloy, an In-Tl alloy, an Li-Zn alloy, an Mn-Zn alloy, a Pd-Tl alloy, a Pb-S alloy, a Pb-Sb alloy, a Pd-Zn alloy, an Sn-Sb alloy, a Tl-Sb alloy, an Sb-Zn alloy, a Ti-Sn alloy, a Tl-Sn alloy, an Sb-In alloy, an Sb-In-Se alloy, a Zr-Sn alloy, a Zr-Th alloy, a Ti-Zn alloy, a Ti-Zr alloy, etc.

As examples of the alloys, ones having the following compositions in weight are preferable. Alloys in which Ag has 30–46% Zn, 6–10% Al, 40–60% Cd, 20–30% In or 13–23% Ga added thereto alone, in which Cu has 10–20% Al, 20–30% Ga, 20–40% In, 20–30% Ge, 15–35% Sn, 10–60% Zn, 5–10% Si, 4–15% Be or 30–45% Sb added thereto alone, in which Au has 15–25% In, 10–15% Ga, 5–25% Zn, 20–55% Cd or 2.5–5% Al added thereto alone, and in which Ni has 55–60% Al or 40–50% Ti added thereto alone; an In - 25 to 35% Tl alloy; an alloy in which Fe has at most 55% Pt added thereto; an Mn - 5 to 50% Cu alloy; and an Se 15–25% - In 30–40% - Sb alloy.

These alloys can have the following element or elements other than the second component further added thereto as the third component, fourth component, fifth component, etc.

One or more elements are selected from among Ia, IIa, IVa, Va, VIa, VIIa, VIII, Ib - Vb and rare-earth elements so as to be at most 15 weight-% in total.

Concretely, Li is preferable as the group Ia, Mg and Ca as the group IIa, Ti, Zr and Hf as the group IVa, V, Nb and Ta as the group Va, Cr, Mo and W as the group VIa, Mn as the group VIIa, Co, Rh, Ir, Fe, Ru, Os, Ni, Pd and Pt as the group VIII, Cu, Ag and Au as the group Ib, Zn and Cd as the group IIb, B, Al, Ga and In as the group IIIb, C, Si, Ge, Sn and Pb as the group IVb, P, Sb and Bi as the group Vb, and Y, La, Ce, Sm, Gd, Tb, Dy and Lu as the rare-earth elements. Especially, 0.1–5 weight-% is favorable.

Regarding the above recording media, in an alloy the solid state of which exhibits different crystalline structures at a first temperature (high temperature) higher than a room temperature and a second temperature (low temperature) lower than the first temperature, the alloy has an alloy composition with which at least a part of the surface thereof forms when quenched from the high temperature, a crystalline structure different from the crystalline structure based on non-quenching at the low temperature.

Owing to heating and cooling treatments in the solid phase state, this alloy has at least two spectral reflection factors at an identical temperature and can reversibly change the spectral reflection factors. That is, the alloy according to the present invention has in the solid phase state thereof phases of different crystalline structures in at least two temperature regions; among the phases, a state with a high temperature phase quenched and a low temperature phase state being a non-quenced standard state exhibit different spectral reflection factors; and the spectral reflection factors are reversibly changed by heating and quenching in the high temperature phase-temperature region and heating and cooling in the low temperature phase-temperature region.

Figure 21:
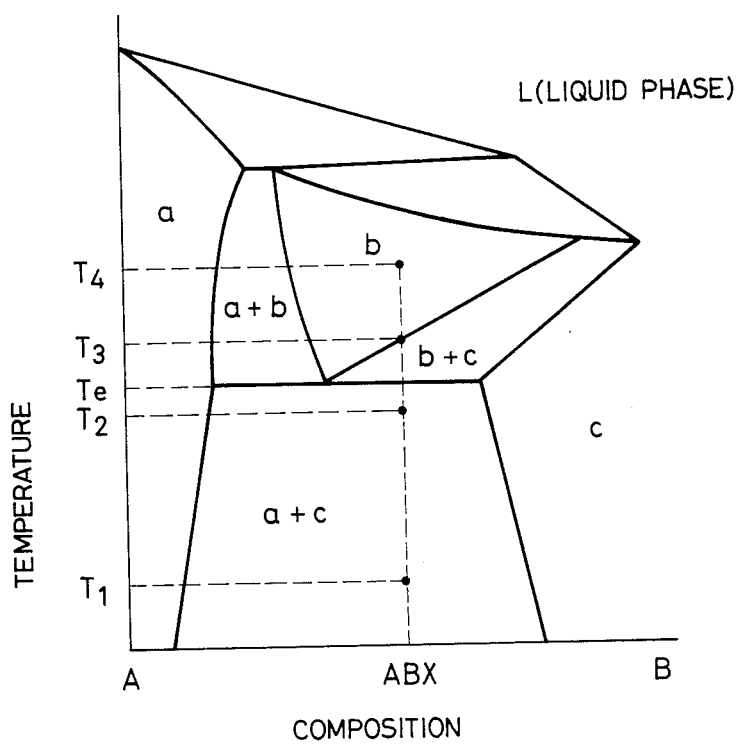
FIG. 21 shows a phase diagram of recording alloys.

As to the reversible changes of the reflection factors of the recording alloy, the principles will be described with reference to FIG. 21. The figure is a state diagram of alloys of an X-Y binary system, in which a solid solution a and intermetallic compounds b and c exist. When an alloy having a composition $AB_x$ is taken as an example, it has the single phase b, a phase (b+c) and a phase (a+c) in the solid phase state thereof. Crystalline structures differ depending upon the respective single-phase states a, b and c, and optical properties, for example, spectral reflection factors differ in the individual and mixed phases respectively. In such an alloy, the phase (a+c) is stable at a temperature $T_1$ which is, in general, a room temperature. When it is heated to a temperature $T_4$ and then quenched, the phase b rapidly cools down to the temperature $T_1$. This phase b may well change into a new phase (for example, b') at the time of the rapid cooling. Since this state differs from the phase (a+c), the spectral reflection factors also differ. When the quenched b-phase (or b'-phase) alloy is heated up to a temperature $T_2$ lower than a temperature Te and then cooled, it changes into the phase (a+c), and the spectral reflection factor returns into the initial state. By repeating such two heating and cooling treatments, the spectral reflection factors can be reversibly changed.

(Alloy Composition)

A recording alloy must be one which has crystalline structures different in high temperature and low temperature states and in which a quenched crystalline structure is formed by quenching from the high temperature. Further, the phase formed by the quenching must change into the crystalline structure in the low temperature state when heated at a predetermined temperature. As regards a cooling rate for obtaining the crystalline structure different from the crystalline structure at the low temperature by means of the quenching from the high temperature in this manner, an alloy which gives rise to such a change of the crystalline structures at $10^2°C$./second or above or at $10^3°$ C./second or above is favorable.

The recording alloy is preferably composed of at least one of group-Ib elements in the periodic table, and at least one element selected from among group-IIb, group-IIIb, group-IVb and group-Vb elements.

(Manufacturing Method)

The recording alloy needs to form an overcooled phase by means of the heating and quenching of the material in order to attain the variableness of the reflection factors. For creating and storing information at high speed, a non-bulky material of small heat capacity whose rapid heating and rapid cooling effects are high is desirable. That is, desirable is a non-bulky material having a volume with which energy thrown into a desired minute area can change, in effect, only a desired area part into the crystalline structure different from the reference crystalline structure over the entire depth. Accordingly, a foil, a film, a thin wire, powder or the like which is a non-bulky material of small heat capacity is desirable for creating information of high density with a desired minute area. In creating information with a minute area which realizes a recording density of 20 megabits/$cm^2$ or above, a film thickness of 0.01–0.2 $\mu m$ is favorable. In general, an intermetallic compound is difficult of plastic working. As an expedient for forming the foil, film, thin wire or powder, accordingly, it is effective to quench and solidify the material directly from a vapor phase or a liquid phase into a predetermined shape. Such methods include PVD (e.g., evaporation or sputtering), CVD, a molten metal quenching method in which a molten metal is poured onto a member of high thermal conductivity rotating at high speed, especially the circumferential surface of a metal roll so as to be quenched and solidified, electroplating, chemical plating, etc. In case of utilizing the film or powdery material, it is effective to form the material directly on a substrate or to bond it on the substrate by means of coating. In case of the coating, a binder which does not cause a reaction etc. even when the powder is heated is favorable. Besides, to the end of preventing the oxidation etc. of the material ascribable to the heating, it is effective to coat the surface of the material and the surface of the film or the coating layer formed on the substrate.

The foil or the thin wire should preferably be formed by the molten-metal quenching method, and should preferably have a thickness or a diameter of 0.1 mm or less. Particularly in manufacturing the foil or the thin wire of a crystal grain size not greater than 0.1 $\mu m$, a thickness or a diameter of 0.05 mm or less is preferable.

The powder should preferably be formed by an atomizing method in which the molten metal is atomized with a gaseous or liquid coolant and is thrown into water thereby to be quenched. The grain size of the powder should preferably be 0.1 mm or less, and particularly an ultrafine powder having a grain size of 1 $\mu m$ or less is preferable.

As stated before, the film can be formed by any of evaporation, sputtering, CVD, electroplating, chemical plating etc. Particularly in forming a film thickness not greater than 0.1 $\mu m$, the sputtering is preferable. The sputtering can readily control an alloy composition aimed at.

(Structure)

The recording alloy must be one which has different crystalline structures at a high temperature and a low temperature, and in which the crystalline structure at the high temperature is brought to a composition of an overcooled phase to be held at the low temperature, by quenching from the high temperature. Favorable is an intermetallic compound which has the crystalline structure of irregular lattices at the high temperature, but the overcooled phase of which has regular lattices of the Cs-Cl type or the $D0_3$ type by way of example. As an alloy capable of greatly changing optical properties, the alloy of the present invention should preferably be one which chiefly forms the intermetallic compound, and in particular, a composition with which the entire alloy forms the intermetallic compound is preferable. This intermetallic compound is called the electron compound, and in particular, one near the alloy composition of a 3/2 electron compound (the average outer-shell electron density e/a of which is 3/2) is favorable.

In addition, the recording alloy should preferably be of an alloy composition which has solid phase transformation, for example, eutectoid transformation or peritectoid transformation, and the alloy can afford a great difference of spectral reflection factors through quenching and non-quenching from the high temperature.

The optical recording alloy should preferably be an alloy having ultrafine crystal grains, and in particular, the crystal grain size should preferably be 0.1 $\mu m$ or less. That is, the crystal grains should preferably be smaller than the value of a wavelength in the visible radiation region, but they may well be smaller than the valve of the wavelength of a semiconductor laser radiation.

(Characteristics)

The recording material can form at an identical temperature, at least two sorts of spectral reflection factors in the visible radiation region. More specifically, the spectral reflection factor of a state having the crystalline structure formed by the quenching from the high temperature needs to be different from the spectral reflection factor of a state having the crystalline structure formed by the non-quenching.

Besides, the difference of the spectral reflection factors of the states established by the quenching and the non-quenching should preferably be 5% or more, and in particular, it should preferably be 10% or more. When the difference of the spectral reflection factors is great, the discrimination of colors by viewing is easy, which is remarkably effective in various uses to be described later.

As a light source for spectral reflection, an electromagnetic wave, even other than visible radiation, is usable and any of infrared radiation, ultraviolet radiation etc. is usable.

As other characteristics of the recording alloy, the electric resistivity, the refractive index of light, the polarization factor of light, the transmission factor of light, etc. can e reversibly changed likewise to the spectral reflection factor, and they can be utilized for recording various information and for reproducing the recorded information.

The spectral reflection factors are affected by the surface roughness condition of the alloy. Therefore, at least the desired part of the alloy should preferably have a specular surface so as to afford the difference of 10% or more in, at least, the visible radiation region as stated before.

With the recording alloy, physical or electrical characteristics such as the spectral reflection factor of an electromagnetic wave, the electric resistivity, the refractive index, the polarization factor and the transmission factor based on the change of the crystalline structures are changed partially or wholly by the heating and quenching, and the alloy can be used in an information recording element by utilizing the changes of the characteristics.

As means for recording information, it is possible to employ electric energies in the forms of a voltage and a current and electromagnetic waves (visible light, radiant heat, infrared radiation, ultraviolet radiation, the light of a photographic flash lamp, an electron beam, a proton ray, the laser beam of an argon laser, a semiconductor laser or the like, high-voltage spark discharge, etc.). Particularly, it is favorable that the change of the spectral reflection factors based on the projection of the energy or wave is utilized to apply the alloy to the optical recording medium. By applying the recording alloy to the recording medium of an optical disc, it can be used in a disc device of the reproduction-only type, the add-on type or the rewriting type, and in particular, it is very effective in the rewriting type disc device. A recording method may be either one successively imparting energy as pulses or one continuously imparting energy. With the former, information can be recorded as digital signals.

The principles of recording and reproduction in the case of applying the recording alloy to the recording medium of an optical disc will be exemplified below. First, the recording medium is locally heated and is quenched after the heating, thereby to hold the crystalline structure of the high temperature region in the low temperature region so as to record predetermined information, or alternatively, the high temperature phase on which the recording is based is locally heated thereby to locally record information with the low temperature phase in the high temperature phase. The information can be reproduced by projecting light on the recorded part and detecting the difference of the optical characteristics of the heated part and an unheated part. Further, the recorded information can be erased in such a way that the part recorded as the information is heated at a temperature lower than the heating temperature of the recording mode. Regarding the light, a short-wavelength laser is preferable in case of a laser beam. Since the reflection factors of the heated part and the unheated part in the present invention are great at a wavelength near 500 nm or 800 nm, the laser light having such a wavelength should preferably be employed for the reproduction. An identical laser source is used for the recording and the reproduction, and another laser light the energy density of which is lower than in the recording is projected for the erasing.

The disc employing the recording alloy for the recording medium has the great merit that whether or not information is recorded can be discriminated by viewing.

More specifically, the recording alloy (a film 21) is formed in the state of a thin film on a substrate 22 as shown in FIG. 22(B), and it is given momentary and high heat energy having a pulse width $\tau_W$ as shown in FIG. 22(A), thereby to be transformed from the first phase into the second phase. Then, the reflection rate changes from ① to ② as shown in each of FIG. 23(A)-23(C). Subsequently, the film 21 is given comparatively long and low heat energy having a pulse width $\tau_E$, thereby to be reversibly transformed into the first phase. At this time, the reflection rate changes from ② to ①. The reflection rate change can be sensed by an optical head device which projects a light beam of low heat energy $P_R$ not contributive to the phase transformation as shown in FIG. 22(A), as a spot on the alloy material 21 and which electrically detects the resulting reflected light. With the optical head, the short duration and high heat profile or the second temperature profile necessary for causing the phase change to the second phase is distributed as light energy for recording, the longer duration and lower heat profile or the first temperature profile inducing the change to the first phase is distributed as light energy for erasing, and the temperature profile based on the projection of the heat energy not directly contributive to the phase change is distributed as light energy for reading.

[Examples]

As the recording characteristic of the phase transformation type recording alloy, it has been revealed that writing is possible with a pulse width of the order of 1 $\mu$s. The recording alloy is hopeful as a high-density recording material owing to the features over the materials of conventional systems, (1) that a rewriting function not included in a prior-art pit system is attained and (2) that the recording lifetime is longer than those of amorphous and crystal transformation type materials having the rewriting function.

As compared with the conventional materials, the phase transformation type recording alloy is higher in the mechanical strength and larger in the amount of elongation and is therefore rich in flexibility. This is convenient especially in case of using the alloy evaporated or sputtered on a thin disc, tape, card etc. A system for recording or erasing information on or from such various information carriers needs to be determined from the quantity of required information, the image of the device, etc., and in particular, a system based on the characteristics of the material needs to be adopted. Since, in this regard, the recording alloy has a high thermal conductivity, it is effective for recording by using pulses of short duration and high heat energy that are impressed to record information on a very small area. Thus, high-speed writing can be achieved.

Figure 23:
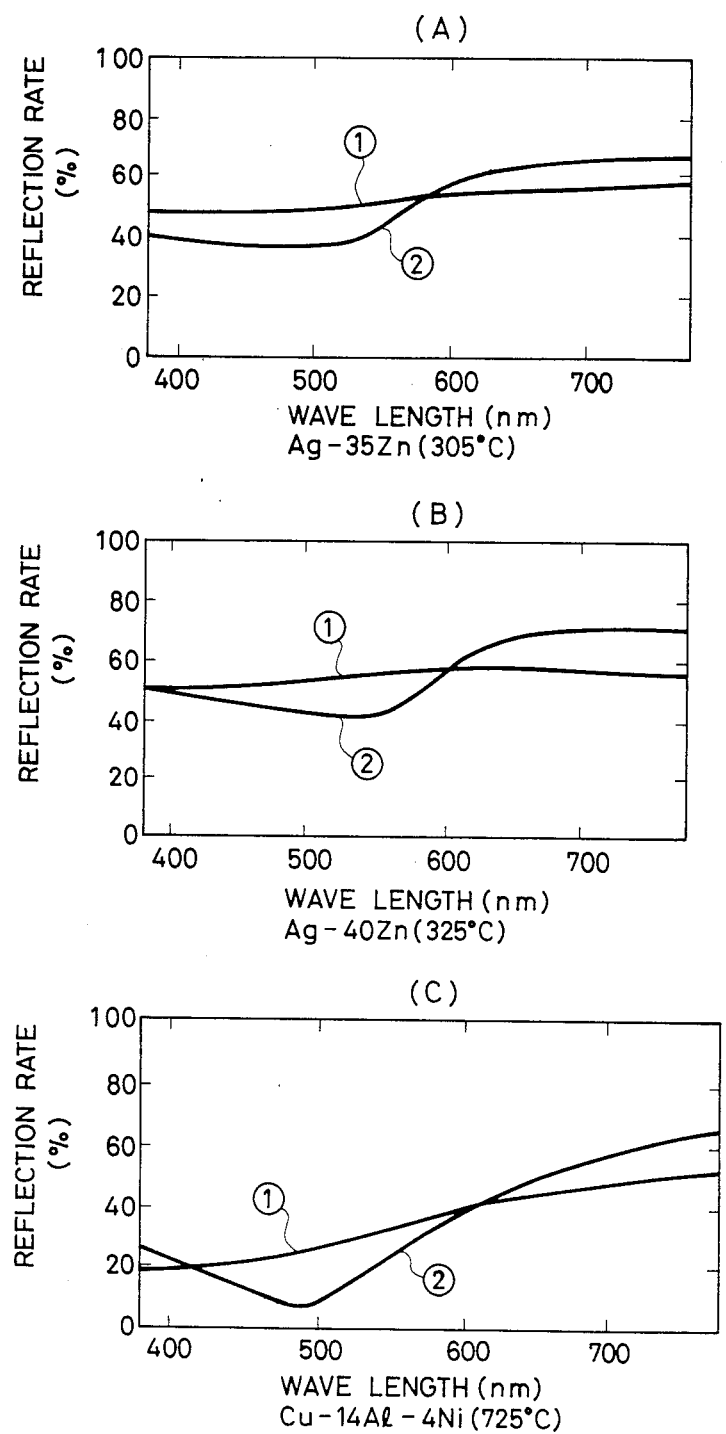
FIGS. 23(A) to 23(C) show diagrams of examples of the spectral reflection characteristics of the recording alloys.

In the erasing mode, when the light energy of the pulse width $\tau_E$ shown in FIG. 22(A) is applied by the use of a semiconductor laser at a lasing wavelength of 830 nm having heretofore been employed., the recorded state ② is turned into the erased state ① and the reflection rate decreases with any of the recording alloys as exemplified in FIGS. 23(A)-23(C). Further, in case of using an Ar+ laser whose wavelength is near 358 nm, the reflection rate increases when the recorded state ② is turned into the erased state ①, so that the direct of the reflection rate change is opposite to the above. With either of the wavelengths, however, the two values of the reflection rates are assumed by the recording and the erasing. By converting these values into electric signals by means of the foregoing optical head, therefore, the alloy can be employed as the meritorious recording medium capable of erasing in an optical information recording apparatus.

Figure 19:
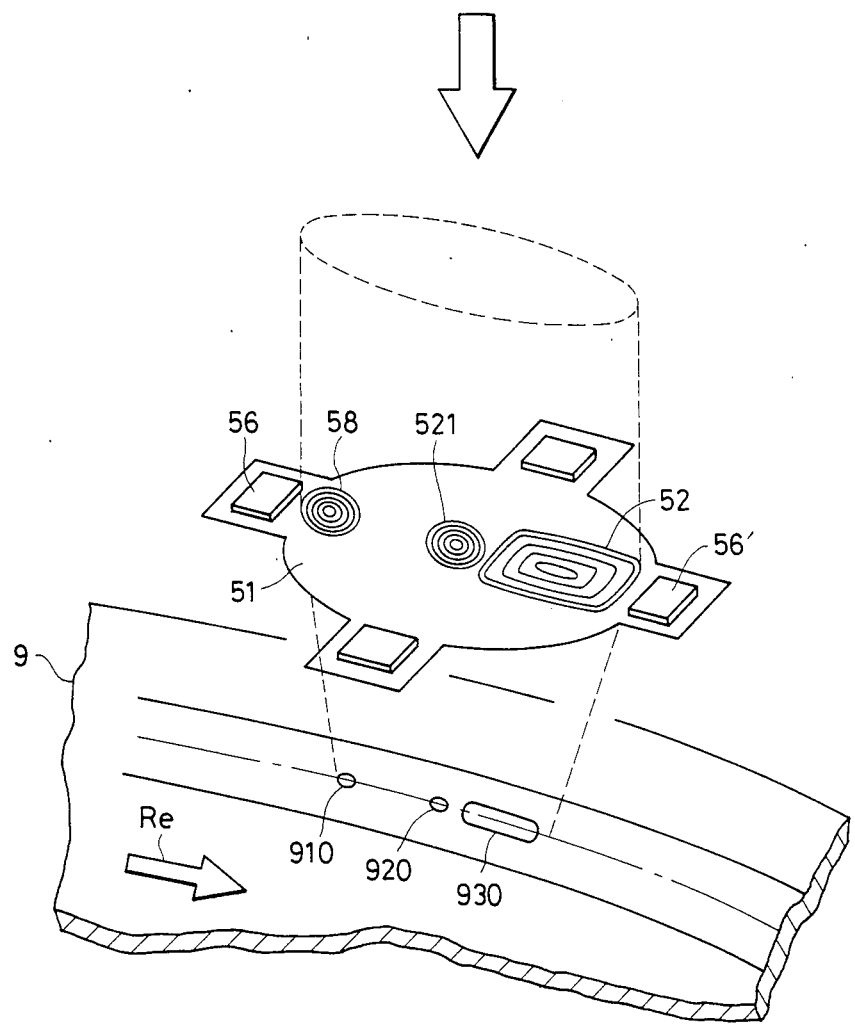
FIG. 19 shows a view of another embodiment of the movable micro lens which has functions necessary for an optical disc.

Referring to FIG. 19, the emergent light of a semiconductor laser arriving in the direction of an arrow is chiefly put into a rectangular lens 52 and a circular lens 521, while light of low intensity at the edge part of the Gaussian distribution of the laser beam is put into another circular lens 58. The input light components are projected on the surface of a disc 9, to form a reading beam 910, a writing beam 920 and an erasing beam 930. By forming the beams of different shapes and intensities on the disc surface at the same time with the elements on a single substrate 51 in this manner, a lens device for an optical head well-suited for an optical disc capable of carrying out reading, erasing and writing operations at will can be provided.

Figure 20:
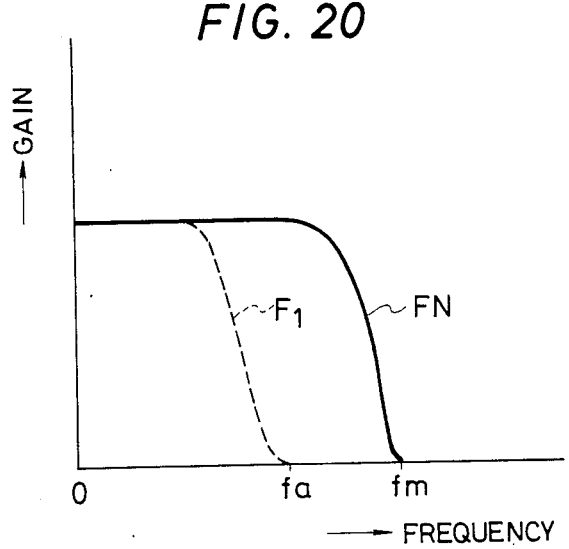
FIG. 20 shows a diagram of the frequency characteristics of the tracking or focus control of an optical disc device to which the movable micro lens of the present invention is applied.

FIG. 20 shows a diagram of the frequency characteristics of a tracking or focus control for explaining one of effects according to the present invention.

In the figure, F1 indicates the frequency characteristic concerning the control of a prior-art optical head, and FN the frequency characteristic concerning the control of the optical head of the present invention.

Since the optical head of the present invention can be made lighter in weight than the prior-art head, a responsive range for controlling the position of a lens can be expanded. Accordingly, a predetermined control can be performed at a speed higher than in the prior art, so that a raised operating speed and an enhanced S/N ratio can be achieved in the recording of information on a disc, the reproduction of signals, etc.

As described above in detail, according to the present invention, an optical lens device can be constructed simply and in a small size. Moreover, focus and track controls are easy, and a frequency characteristic higher than in prior arts can be attained. Besides, a multifunction lens device having the functions of writing, erasing and sensing a track and information can be realized on a single substrate.

What we claim is:

1. A beam spot control device using a thin micro les with an actuator comprising a movable thin film micro lens which is formed on a thin film of light transparent elastic material, end parts of the thin film of elastic material being fixed, and a thin drive means for moving said lens, said drive means being mounted on a peripheral portion of said elastic material.

2. A device according to claim 1, wherein the peripheral portion of said lens on which said drive member is mounted is made of an elastic material.

3. A device according to claim 1, wherein in said drive means comprises piezoelectric transducers and means for adjusting voltages applied to said piezoelectric transducers, wherein said elastic material is bent corresponding to an applied voltage to said piezoelectirc transducers so that a focal position of said lens is controlled.

4. A device according to claim 3, wherein said piezoelectric transducers are disposed at positions on opposite sides of said lens, in the peripheral portion of said elastic material, and the voltage adjusting means apply voltages of the same polarity and the same potential to said transducers so as to adjust the focal position in a direction perpendicular to said lens.

5. A device according to claim 3, wherein said piezoelectric transducers are disposed at positions on opposite sides of said lens, in the peripheral portion of said elastic material, and the voltage adjusting means apply voltages of opposite polarities and the same potential or voltages of the same polarity and unequal potentials to said transducers so as to adjust the focal position in a direction parallel to said lens.

6. A device according to claim 3, together with an optical information recording apparatus comprising a movable recording medium which is located opposite said lens and on which a light beam passing through said lens is projected, said piezoelectric transducers being disposed at both ends of the peripheral portion of said elastic material parallel to a moving direction of said recording medium or at both ends of the peripheral portion of said elastic material orthogonal to the moving direction.

7. A device according to claim 1, wherein said drive means comprises magnets which are disposed in the peripheral portion of said elastic material, annular coils which are disposed near side surfaces of said lens and in opposition to said magnets, and means to adjust voltages applied to said coils, wherein said elastic material is bent cooresponding to an applied voltage to said coils so that focal position of said lens is controlled.

8. A device according to claim 7, together with an optical information recording apparatus comprising a movable recording medium which is located opposite said lens and on which a light beam passing through said lens is projected, said magnets being disposed at both ends of a front or rear surface of the peripheral portion of said elastic material parallel to a moving direction of said recording medium or at both ends of a front or rear surface of the peripheral portion of said elastic material orthogonal to the moving direction.

9. A device according to claim 8, wherein said magnets disposed in the peripheral portion of said elastic material in parallel with the moving direction of said recording medium have their polarities held in agreement.

10. A device according to claim 8, wherein said magnets disposed at both ends of the peripheral portion of said elastic material orthogonally to the moving direction have their polarities held in agreement.

11. A device according to claim 8, wherein said coils disposed on a front surface of said lens in opposition to said magnets are wound in series along the peripheral part of said lens, and said lens has the focal position parallel to said lens adjusted by changing values of the applied voltages to said coils.

12. A device according to claim 8, wherein said coils disposed on a rear surface of said lens in opposition to said magnets are wound in parallel or orthogonally to the moving direction of said recording medium, and said lens has the focal position perpendicular to said lens adusted by changing values of the applied voltage to said coils.

13. A device according to claim 1, wherein said lens comprises a first thin-film lens which projects a light beam on a recording medium which is arranged at a position opposing said lens and rotates, and which represents recording information of the recording medium on the basis of resulting reflected light, and a second thin-film lens which consists of a pair of lenses arranged in a direction orthogonal to a rotating direction of the recording medium and which receives input light from one side and reflected light from the other side thereof so as to perform detection for tracking of the recording medium, and wherein said drive member consists of a pair of elements which are disposed in outer parts in the same direction as that of said second thin-film lens and applied voltages of which are adjusted on the basis of the reflected light obtained through said second thin-film lens.

14. A device according to claim 1, wherein said lens comprises a first thin-film lens which projects a light beam on a rotatable recording medium located at a position opposing said lens and which reproduces recorded information of the recording medium on the basis of resulting reflected light, and a third thin-film lens which consists of a pair of lenses arranged in a rotating direction of the recording medium and which receives input light from one side and reflected light from the other side thereof so as to perform detection for jittering of the recording medium, and wherein said drive means consists of a pair of elements which are disposed in outer parts in the same direction as that of a second thin-film lens and of applied voltages which are adjusted on the basis of the reflected light obtained through said third thin-film lens.

15. A device according to claim 1, wherein said lens projects a light beam on a rotatable recording medium located at a position opposing said lens, and reproduces recorded information of the recording medium on the basis of resulting reflected light, and wherein said drive means consists of a pair of elements which are arranged in a rotating direction of the recording medium through the thin-film lens and to which signals of high frequency are applied to form an elliptic beam for use in erasing the recording information.

16. A device according to claim 1, further comprising a light source, a polarizing beam splitter which has a first face opposite to said light source, a second face opposite to the first face, and a side face which transmits output light of said light source from the first face to the second face and which refracts reflected light of the output light to deliver the refracted light, and a photodetector which is disposed in opposition to the side face of said polarizing beam splitter, said optical lens device being disposed in opposition to the second face so as to deliver the transmitter light from the second face to a recording medium through said optical lens device.

17. A device according to claim 16, wherein at least one of the first face and side face of said polarizing beam splitter is a thin-film lens.

18. A device according to claim 17, together with an optical information recording apparatus wherein said recording medium is made of a metal or an alloy with which a crystalline structure at a high temperature in a solid state is held when overcooled from the high temperature.

19. A device according to claim 17, together with an optical information recording apparatus wherein said recording medium is made of a metal or an alloy in a crystalline state exhibiting phase transformation, which has different crystalline structures in at least two temperature regions in a solid state; heating means to form concave or convex parts owing to the transformation between the phases, thereby to change reflection states of light from a base surface thereof and to discriminatively store signals, characters, patterns or/and symbols as information, or to convert the concave or convex parts into an original state to thereby erase such information; and means to reproduce the information.

20. A device according to claim 17, together with an optical information recording apparatus wherein said recording medium is made of a metal or an alloy whose principal ingredient is any of metal elements and transition metal elements of groups I.b to VII.b and group VIII in a periodic table.

21. A device according to claim 16, wherein said recording medium is made of a metal or an alloy which has at least two sorts of crystalline structures in a solid state and with which the crystalline structure in one temperature region is held in the other temperature region and/or volume changes different from each other arise in a crystal state.

22. A device according to claim 16, wherein a thin-film lens of the side face is constructed of a Fresnel zone plate which is formed with recesses in two orthogonal directions.

23. A device according to claim 16, wherein a thin-film lens of the first face is constructed of a first Fresnel zone plate on which elliptic light from said light source is projected and which is formed with recesses in a longitudinal direction of the eliptic light, and a second Fresnel zone plate on which light focused by said first Fresnel zone plate is projected and which is formed with recesses in the same direction as in said first Fresnel zone plate.

* * * * *